US012627445B2

(12) United States Patent
Shi et al.

(10) Patent No.: US 12,627,445 B2
(45) Date of Patent: May 12, 2026

(54) SRS SENDING METHOD AND APPARATUS, SRS RECEIVING METHOD AND APPARATUS, AND SRS CONFIGURATION METHOD AND APPARATUS

(71) Applicant: VIVO MOBILE COMMUNICATION CO., LTD., Dongguan (CN)

(72) Inventors: Yuan Shi, Dongguan (CN); Rakesh Tamrakar, Dongguan (CN); Yang Song, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 295 days.

(21) Appl. No.: 18/374,631

(22) Filed: Sep. 28, 2023

(65) Prior Publication Data

US 2024/0022378 A1    Jan. 18, 2024

Related U.S. Application Data

(63) Continuation of application No. PCT/CN2022/083669, filed on Mar. 29, 2022.

(30) Foreign Application Priority Data

Mar. 29, 2021    (CN) .......................... 202110336680.4

(51) Int. Cl.
*H04L 5/00* (2006.01)
(52) U.S. Cl.
CPC .......... *H04L 5/0051* (2013.01); *H04L 5/0012* (2013.01)

(58) Field of Classification Search
CPC .... H04L 25/0224; H04B 1/713; H04B 1/7143
See application file for complete search history.

(56) References Cited

U.S. PATENT DOCUMENTS

| 10,341,144 B2 | 7/2019 | Choi et al. | |
| 2019/0109732 A1* | 4/2019 | Choi ..................... | H04L 5/0051 |

(Continued)

FOREIGN PATENT DOCUMENTS

| CN | 104283581 A | 1/2015 |
| CN | 108111279 A | 6/2018 |

(Continued)

OTHER PUBLICATIONS

International Search Report issued in corresponding International Application No. PCT/CN2022/083669, mailed Jun. 20, 2022, 6 pages.

(Continued)

*Primary Examiner* — Shukri Taha
(74) *Attorney, Agent, or Firm* — IPX PLLC

(57) ABSTRACT

A Sounding Reference Signal (SRS) sending method and apparatus, an SRS receiving method and apparatus, and an SRS configuration method and apparatus, are provided. The SRS sending method includes: sending an SRS in a partial frequency hopping manner on a complete bandwidth corresponding to R Orthogonal Frequency Division Multiplexing (OFDM) symbols in one SRS resource set or SRS resource, where the SRS is sent on a partial bandwidth in each complete bandwidth, there are at least two complete bandwidths, and sending position indexes of partial bandwidths in the at least two complete bandwidths are different, and R is a repetition factor.

16 Claims, 14 Drawing Sheets

(56)             References Cited

U.S. PATENT DOCUMENTS

2020/0059384 A1      2/2020  Zhang et al.
2023/0111063 A1*     4/2023  Ji ......................... H04L 5/0012
                                                            370/329
2023/0189232 A1*     6/2023  Rastegardoost ...... H04L 5/0012
                                                            370/329

FOREIGN PATENT DOCUMENTS

CN          109152019 A      1/2019
CN          111277389 A      6/2020
CN          111314039 A      6/2020

OTHER PUBLICATIONS

Moderator ZTE.,"FL summary #1 on SRS enhancements", 3GPP
TSG RAN WG1 Meeting #104-e R1-2101783, Jan. 25-Feb. 5, 2021,
49 pages.
Moderator ZTE, "Fl summary #2 on SRS enhancements", 3GPP
TSG RAN WG1 Meeting #104-e R1-2101914, Jan. 25-Feb. 5, 2021,
10 pages.
Extended European Search Report issued in related European
Application No. 22778936.9, mailed Aug. 7, 2024, 11 pages.
Second Office Action issued in related Chinese Application No.
202110336680.4, mailed May 8, 2024, 13 pages.
Decision of Rejection issued in related Chinese Application No.
202110336680.4, mailed Aug. 14, 2024, 5 pages.

* cited by examiner

Network side
device

11

11

Terminal

Terminal

A terminal sends an SRS in a partial frequency hopping
manner on a complete bandwidth corresponding to R
OFDM symbols in one SRS resource set or SRS resource

21

One complete
frequency hopping
period (4 times of
frequency hopping)

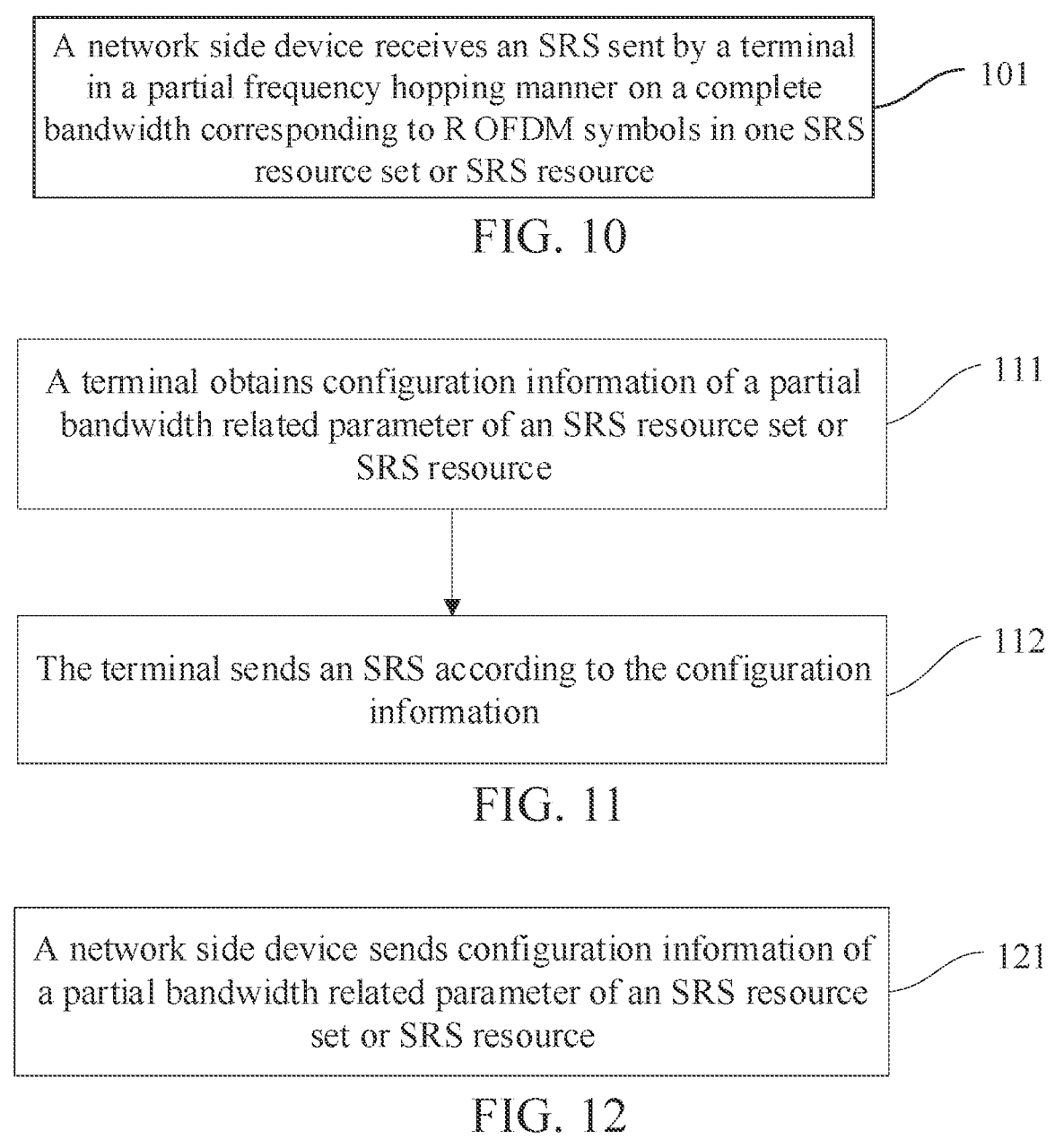

A network side device receives an SRS sent by a terminal in a partial frequency hopping manner on a complete bandwidth corresponding to R OFDM symbols in one SRS resource set or SRS resource — 101

FIG. 10

A terminal obtains configuration information of a partial bandwidth related parameter of an SRS resource set or SRS resource — 111

The terminal sends an SRS according to the configuration information — 112

FIG. 11

A network side device sends configuration information of a partial bandwidth related parameter of an SRS resource set or SRS resource — 121

Obtaining module

142

Sending module

150

151

Receiving module

160

170

SRS SENDING METHOD AND APPARATUS, SRS RECEIVING METHOD AND APPARATUS, AND SRS CONFIGURATION METHOD AND APPARATUS

CROSS-REFERENCE TO RELATED APPLICATIONS

This application is a continuation of International Application No. PCT/CN2022/083669, filed on Mar. 29, 2022, which claims the priority of Chinese Patent Application No. 202110336680.4, filed Mar. 29, 2021. The entire contents of each of the above-identified applications are expressly incorporated herein by reference.

TECHNICAL FIELD

This application relates to the field of wireless communications technologies, and specifically to a Sounding Reference Signal (SRS) sending method and apparatus, an SRS receiving method and apparatus, and an SRS configuration method and apparatus.

BACKGROUND

It is being discussed that partial frequency domain sounding is performed using an SRS on an Orthogonal Frequency Division Multiplexing (OFDM) symbol of one SRS resource or SRS resource set, that is, an SRS is sent only on a partial continuous bandwidth (briefly referred to as a partial bandwidth below) on a complete bandwidth of an OFDM symbol of one SRS resource or SRS resource set.

However, if an SRS is sent only on a partial bandwidth, a terminal cannot completely sound a channel.

SUMMARY

Embodiments of this application provide an SRS sending method and apparatus, an SRS receiving method and apparatus, and an SRS configuration method and apparatus.

According to a first aspect, an SRS sending method is provided, including:

sending, by a terminal, an SRS in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

According to a second aspect, an SRS sending method is provided, including:

obtaining, by a terminal, configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter; and sending, by the terminal, an SRS according to the configuration information.

According to a third aspect, an SRS receiving method is provided, including:

receiving, by a network side device, an SRS sent by a terminal in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

According to a fourth aspect, an SRS configuration method is provided, including:

sending, by a network side device, configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

According to a fifth aspect, an SRS sending apparatus is provided, including:

a sending module, configured to send an SRS in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

According to a sixth aspect, an SRS sending apparatus is provided, including:

an obtaining module, configured to obtain configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter; and a sending module, configured to send an SRS according to the configuration information.

According to a seventh aspect, an SRS receiving apparatus is provided, including:

a receiving module, configured to receive an SRS sent by a terminal in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

According to an eighth aspect, an SRS configuration apparatus is provided, including:

a first sending module, configured to send configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

According to a ninth aspect, a terminal is provided. The terminal includes a processor, a memory, and a program or an instruction stored on the memory and runnable on the processor, where when the program or instruction is executed by the processor, steps of the method according to the first aspect or second aspect are implemented.

According to a tenth aspect, a terminal is provided, including a processor and a communication interface, where the communication interface is configured to send an SRS in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

According to an eleventh aspect, a terminal is provided, including a processor and a communication interface, where the communication interface is configured to obtain configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter; and send an SRS according to the configuration information.

According to a twelfth aspect, a network side device is provided. The network side device includes a processor, a memory, and a program or an instruction stored on the memory and runnable on the processor, where when the program or instruction is executed by the processor, steps of the method according to the third aspect or fourth are implemented.

According to a thirteenth aspect, a network side device is provided, including a processor and a communication interface, where the communication interface is configured to receive an SRS sent by a terminal in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

According to a fourteenth aspect, a network side device is provided, including a processor and a communication interface, where the communication interface is configured to send configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

According to a fifteenth aspect, a readable store medium is provided, where a program or an instruction is stored on the readable store medium, where when the program or instruction is executed by a processor, steps of the method according to the first aspect, second aspect, third aspect, or fourth aspect are implemented.

According to a sixteenth aspect, a chip is provided, where the chip includes a processor and a communication interface, the communication interface is coupled to the processor, and the processor is configured to run a program or an instruction to implement the method according to the first aspect, second aspect, third aspect, or fourth aspect.

According to a seventeenth aspect, a computer program/program product is provided, the program, where the computer program/program product is stored in a non-transient storage medium, and the program/program product is executed by at least one processor to implement steps of the method according to the first aspect, second aspect, third aspect, or fourth aspect.

In the embodiments of this application, a terminal can send an SRS on a partial bandwidth of a complete bandwidth, and sending position indexes of partial bandwidths of at least two complete bandwidths are different, thereby helping the terminal obtain complete channel characteristics.

BRIEF DESCRIPTION OF THE DRAWINGS

FIG. 10 is a flowchart of an SRS receiving method according to another embodiment of this application;

FIG. 11 is a flowchart of an SRS sending method according to another embodiment of this application;

FIG. 12 is a flowchart of an SRS configuration method according to an embodiment of this application;

DETAILED DESCRIPTION

The following describes the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application fall within the protection scope of this application.

The specification and claims of this application, and terms "first" and "second" are used to distinguish similar objects, but are not used to describe a specific sequence or order. It should be understood that, the terms used in this way is exchangeable in a proper case, so that the embodiments of this application can be implemented in another order except those shown or described herein. In addition, objects distinguished by "first" and "second" usually belong to one type, and a quantity of objects is not limited. For example, there may be one or more first objects. In addition, "and/or" in this specification and the claims represents at least one of the connected objects. The character "/" usually indicates an "or" relationship between associated objects.

It should be noted that, the technologies described in the embodiments of this application are not limited to the Long Term Evolution (LTE)/LTE-Advanced (LTE-A) system, and may be further applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms "system" and "network" may be used interchangeably in the embodiments of this application. The described technologies can be applied to the systems and radio technologies mentioned above, and can also be applied to other systems and radio technologies. The following descriptions describe a New Radio (NR) system for an example purpose, and NR terms are used in most of the following descriptions, but these technologies may also be applied to an application other than the NR system application, such as a 6th Generation (6G) communication system.

Figures 1, 2:
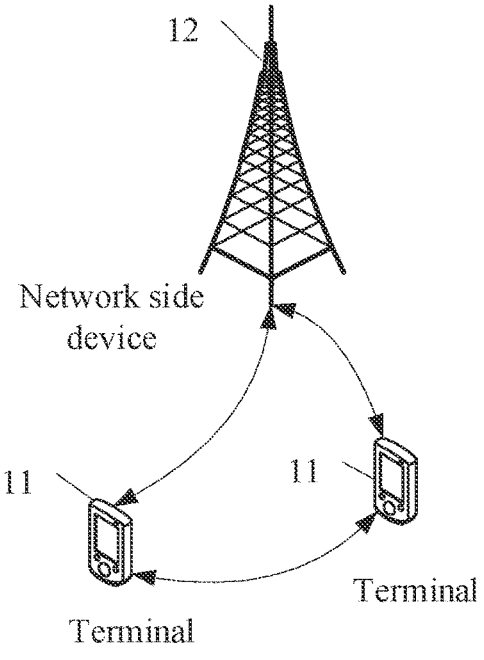
FIG. 1 is a block diagram of a wireless communication system to which an embodiment of this application is applicable.
FIG. 2 is a flowchart of an SRS sending method according to an embodiment of this application.

FIG. 1 is a block diagram of a wireless communication system to which an embodiment of this application is applicable. The wireless communication system includes a terminal 11 and a network side device 12. The terminal 11 may be also referred to as a terminal device or User Equipment (UE). The terminal 11 may be a terminal side device such as a mobile phone, a tablet personal computer, a laptop computer or referred to as a notebook computer, a Personal Digital Assistant (PDA), a palmtop computer, a netbook, an Ultra-Mobile Personal Computer (UMPC), a Mobile Internet Device (MID), a wearable device, a Vehicle UE (VUE), or a Pedestrian UE (PUE). The wearable device includes a smartwatch, a band, a headset, glasses, and the like. It should be noted that the specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Network (WLAN) access point, a Wi-Fi node, a Transmitting Receiving Point (TRP), or another proper term in the field. As long as a same technical effect is achieved, the base station is not limited to a specific technical term. It should be noted that only a base station in an NR system is used as an example in the embodiments of this application, but a specific type of the base station is not limited.

An SRS sending method and apparatus, an SRS receiving method and apparatus, and an SRS configuration method and apparatus provided in the embodiments of this application are described in detail below with reference to the accompanying drawings by using some embodiments and application scenarios thereof.

Related content of an SRS involved in this application is first described below.

Referring to Table 1, Table 1 is an SRS bandwidth configuration table agreed on by a protocol, where $C_{SRS}$ and $B_{SRS}$ in the table are index parameters, $m_{SRS}^b$ is a complete bandwidth of an SRS on one OFDM symbol, and $N_0$, $N_1$, $N_2$, and $N_3$ are quantities of times of frequency hopping. A network side device may control a value of $m_{SRS}^b$ by configuring C_SRS and B_SRS parameters.

TABLE 1

| | SRS bandwidth configuration | | | | | | | |
|---|---|---|---|---|---|---|---|---|
| | $B_{SRS} = 0$ | | $B_{SRS} = 1$ | | $B_{SRS} = 2$ | | $B_{SRS} = 3$ | |
| $C_{SRS}$ | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |

7

TABLE 1-continued

| | SRS bandwidth configuration | | | | | | | |
| | $B_{SRS}=0$ | | $B_{SRS}=1$ | | $B_{SRS}=2$ | | $B_{SRS}=3$ | |
| $C_{SRS}$ | $m_{SRS,\,0}$ | $N_0$ | $m_{SRS,\,1}$ | $N_1$ | $m_{SRS,\,2}$ | $N_2$ | $m_{SRS,\,3}$ | $N_3$ |
|---|---|---|---|---|---|---|---|---|
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

Current SRS transmission supports comb 2, comb 4, and comb 8, respectively indicating that one of every 2 subcarriers is occupied, one of every 4 subcarriers is occupied, and one of every 8 subcarriers is occupied for SRS transmission. A sequence length $$M_{sc}^{SRS},\,b$$

of the SRS may be calculated using the following formula:

$$M_{sc}^{SRS},\,b = m_{SRS},\,b\ N_{sc}^{RB}/K_{TC},$$

where $m_{SRS^{,b}}$ is a complete bandwidth of the SRS on one OFDM symbol obtained by configuring $C_{SRS}$ and $B_{SRS}$ parameters, $$N_{sc}^{RB}$$

indicates a quantity of subcarriers in one Resource Block (RB), $K_{TC}$ indicates a comb size, and the foregoing comb 2, comb 4, and comb 8 respectively correspond to comb sizes 2, 4, and 8.

A frequency domain position of the SRS on one OFDM symbol is jointly determined through parameters such as $n_{shift}$ and $n_{RRC}$, where $n_{shift}$ indicates a frequency domain shift value relative to a reference point grid, and $n_{RRC}$ is an SRS bandwidth sending start position parameter.

In the existing protocol, an SRS frequency domain start position $$k_0^{(p_i)}$$

is determined through the following formula:

$$k_0^{(p_i)} = \overline{k}_0^{(p_i)} + \sum_{b=0}^{B_{SRS}} K_{TC} M_{sc,b}^{SRS} n_b \text{ where}$$

$$\overline{k}_0^{(p_i)} = n_{shift} N_{sc}^{RB} + \left(k_{TC}^{(p_i)} + k_{offset}^{l'}\right) \bmod K_{TC};$$

8

-continued if $n_{SRS}^{cs} \in \{n_{SRS}^{cs,max}/2,\ \ldots,\ n_{SRS}^{cs,max} - 1\}$ and $$N_{ap}^{SRS} = 4 \text{ and } p_i \in \{1001,\,1003\},$$

$$k_{TC}^{(p_i)} = \left(\overline{k}_{TC} + K_{TC}/2\right) \bmod K_{TC}$$

otherwise, $k_{TC}^{(p_i)} = \overline{k}_{TC};$ $n_{shift}$ is a frequency domain shift value relative to a reference point grid;

$$N_{sc}^{RB}$$

is a quantity of subcarriers in one RB;

$$k_{TC}^{(p_i)}$$

is a comb offset of a port $p_i$;

$$k_{offset}^{l'}$$

is one additional shift value agreed on by the protocol;
$K_{TC}$ is a comb size;
$\overline{k}_{TC}$ is a comb offset configured in the SRS;

$$n_{SRS}^{cs}$$

is a cyclic shift value configured in the SRS;

$$n_{SRS}^{cs,max}$$

is a maximum cyclic shift value, is agreed on the protocol, and is related to a comb size; and
$n_b$ indicates a frequency domain position index, and is obtained through a parameter configured in the SRS.

In addition, the SRS supports repetitive sending, R represents a repetition factor, and the repetition factor represents a quantity of times of repetition of the SRS on a time domain symbol, that is, complete bandwidth sizes and frequency domain positions of the SRS on a plurality of repetitive OFDM symbols are completely the same.

For the current SRS sending, a frequency domain position of SRS sending on each OFDM symbol is determined according to a value of an SRS sending position counter $n_{SRS}$.

For an aperiodic SRS, an SRS sending position counter is $n_{SRS} = \lfloor l'/R \rfloor$.

For a periodic and semi-persistent SRS, a sending position counter is $n_{SRS} =$ $$\left(\frac{N_{slot}^{frame,\mu} n_f + n_{s,f}^{\mu} - T_{offset}}{T_{SRS}}\right) \cdot \left(\frac{N_{symb}^{SRS}}{R}\right) + \left\lfloor \frac{l'}{R} \right\rfloor$$

$$\left(N_{slot}^{frame,\mu} n_f + n_{s,f}^{\mu} - T_{offset}\right) \bmod T_{SRS} = 0$$

needs to be satisfied;

l' represents a symbol index of the SRS, where $$l' = 0, 1, \ldots, N_{symb}^{SRS} - 1;$$

R represents a repetition factor of the SRS;

$T_{offset}$ represents a period offset of the SRS;

$T_{SRS}$ represents a period of the SRS; and $$N_{symb}^{SRS}$$

represents a quantity of symbols of the SRS.

The counter $n_{SRS}$ is used in the following formulas:

$$n_b = \begin{cases} \lfloor 4n_{RRC}/m_{SRS,b} \rfloor \bmod N_b & b \le b_{hop} \\ (F_b(n_{SRS}) + \lfloor 4n_{RRC}/m_{SRS,b} \rfloor) \bmod N_b & \text{otherwise} \end{cases}$$

$$F_b(n_{SRS}) =$$

$$\begin{cases} (N_b/2)\left\lfloor \dfrac{n_{SRS} \bmod \Pi_{b'=b_{hop}}^{b} N_{b'}}{\Pi_{b'=b_{hop}}^{b-1} N_{b'}} \right\rfloor + \left\lfloor \dfrac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases}$$

That is to say, when frequency hopping starts, that is, when $b_{hop} < B_{SRS}$, a frequency domain position index $n_b$ is related to $n_{SRS}$.

It is being discussed that partial frequency domain sounding is performed using an SRS on an OFDM symbol of one SRS resource or SRS resource set, that is, an SRS is sent only on a partial continuous bandwidth on a complete bandwidth of an OFDM symbol of one SRS resource or SRS resource set. A possible form of a partial bandwidth is $$\left(\frac{m_{SRS,b}}{P_F}\right),$$

where $P_F$ is a partial bandwidth factor, whose possible value is 2, 3, 4, 8, or the like, and because $$\left(\frac{m_{SRS,b}}{P_F}\right)$$

causes occurrence of a phenomenon that exact division cannot be implemented, it is necessary to introduce a corresponding rounding manner such as rounding up or rounding down, to perform rounding up to obtain a multiple of 2 or the like. For a partial bandwidth for sending one SRS resource, a complete bandwidth on one OFDM symbol may be divided into at least one available start position by a partial bandwidth factor or a bandwidth size agreed on by a protocol or configured by a network.

Currently, a method for indicating a parameter such as a sending start position in a partial bandwidth or a partial bandwidth factor of one SRS resource on the one OFDM symbol is still not definite. In addition, after a sending start position in a partial bandwidth is determined, a sending start position in a partial bandwidth of the SRS on one OFDM symbol cannot be converted between a plurality of sending periods or a plurality of times of frequency hopping. As a result, interference immunity of the UE is reduced, and after the partial bandwidth sending method is used, a bandwidth cannot be completely sounded.

To resolve the foregoing problem, referring to FIG. 2, an embodiment of this application provides an SRS sending method, including:

Step 21: A terminal sends an SRS in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

In the embodiments of this application, a terminal can send an SRS on a partial bandwidth of a complete bandwidth, and sending position indexes of partial bandwidths of at least two complete bandwidths are different, thereby helping the terminal obtain complete channel characteristics.

In embodiments of this application, the sending, by a terminal, an SRS in a partial frequency hopping manner on a complete bandwidth corresponding to R OFDM symbols in one SRS resource includes:

sending, by the terminal, an SRS according to at least one of sending position indexes of partial bandwidths, a quantity M of sending position indexes of partial bandwidths in a partial frequency hopping period, a partial frequency hopping rule, and a sending position index sequence of partial bandwidths.

In embodiments of this application, M satisfies one of the following conditions:

(1) M is equal to N, where N is a quantity of sending position indexes of partial bandwidths determined from the complete bandwidths corresponding to the R OFDM symbols, and N is a positive integer greater than or equal to 1.

(2) If N partial bandwidth sizes corresponding to the N sending position indexes of the partial bandwidths are same, M is equal to N.

That is to say, if the terminal expects that N partial bandwidth sizes corresponding to the N sending position indexes of the partial bandwidths are same, M is equal to N.

(3) If N partial bandwidth sizes corresponding to the N sending position indexes of the partial bandwidths are not completely the same, M is equal to $N_1$, where $N_1$ is a quantity of sending position indexes corresponding to a maximum partial bandwidth size in the N partial bandwidths corresponding to the N sending position indexes of the partial bandwidths.

In some implementations, except a partial bandwidth corresponding to the maximum partial bandwidth size, other partial bandwidths have partial frequency hopping disabled.

(4) If N partial bandwidth sizes corresponding to the N sending position indexes of the partial bandwidths are not completely the same, M is equal to $N_2$, where $N_2$ is a quantity of sending position indexes corresponding to a minimum partial bandwidth size in the N partial bandwidths corresponding to the N sending position indexes of the partial bandwidths.

(5) M is less than or equal to N, and is indicated by a network side device.

In embodiments of this application, N is determined based on at least one of the following parameters: a partial bandwidth factor, a complete bandwidth size, and a partial bandwidth size.

In embodiments of this application, the method further includes: obtaining, by the terminal, configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

In embodiments of this application, the method further includes: receiving, by the terminal, first indication information, where the first indication information is used for indicating one target parameter value from the at least one parameter value configured for the partial bandwidth related parameter.

In embodiments of this application, in one complete frequency hopping period, a sending position index of each partial bandwidth with frequency hopping enabled is the same. That is to say, in one complete frequency hopping period, a sending start position in each partial bandwidth with frequency hopping enabled does not change, that is, a position relative to a complete bandwidth corresponding to R OFDM symbols does not change.

In embodiments of this application, the complete frequency hopping period refers to one complete frequency hopping period in which the complete bandwidth of the R OFDM symbols starts performing frequency hopping from a start position in one complete bandwidth according to a protocol rule until jumping back to the start position.

In embodiments of this application, a frequency hopping start position in a partial bandwidth in one complete frequency hopping period is a frequency domain position determined according to a start position of a first time of frequency hopping agreed on by a protocol; that is, it is determined by an index $n_b$ determined according to an initial parameter configuration.

Alternatively, a frequency hopping start position in a partial bandwidth in one complete frequency hopping period is a frequency domain position determined according to X symbols or slots after enabling of partial frequency hopping. That is to say, it is determined by an index $n_b$ corresponding to a frequency domain position of the SRS determined according to an initial parameter configuration and X symbols or slots. In some implementations, the index $n_b$ is related to a sending position index of a partial bandwidth in partial frequency hopping.

X may include time from receiving the partial bandwidth enabling signaling to performing ACKnowledgement (ACK) feedback or Negative ACKnowledgement (NACK) feedback.

In embodiments of this application, in adjacent complete frequency hopping periods, sending position indexes of partial bandwidths with frequency hopping enabled are different.

In embodiments of this application, sending position indexes of adjacent partial bandwidths are different.

In embodiments of this application, the method further includes: receiving, by the terminal, partial frequency hopping enabling signaling, where the partial frequency hopping enabling signaling is used for indicating whether the terminal, one SRS resource set, or one SRS resource enables partial frequency hopping.

In embodiments of this application, the partial frequency hopping enabling signaling is Downlink Control Information (DCI), a Media Access Control (MAC) Control Element (CE), or Radio Resource Control (RRC) signaling.

In embodiments of this application, the sending, by a terminal, an SRS in a partial frequency hopping manner on a complete bandwidth corresponding to R OFDM symbols in one SRS resource includes one of the following:

sending, by the terminal, an SRS in the partial frequency hopping manner in X symbols or slots after receiving of the partial frequency hopping enabling signaling; and sending, by the terminal, an SRS in the partial frequency hopping manner in X symbols or slots after reporting of ACK or NACK feedback after receiving of the partial frequency hopping enabling signaling.

In embodiments of this application, the partial frequency hopping rule is increasing index values in forward order or reducing index values in reverse order. That is to say, a sending position index of a partial bandwidth of current frequency hopping is determined according to a sending position index of a partial bandwidth of a previous time of frequency hopping.

In embodiments of this application, a sending position index of a partial bandwidth of current frequency hopping=(a sending position index of a partial bandwidth of a previous time of frequency hopping+n)mod(M); or a sending position index of a partial bandwidth of current frequency hopping=(a sending position index of a partial bandwidth of a previous time of frequency hopping+n)mod(N); or a sending position index of a partial bandwidth of current frequency hopping=(a sending position index of a partial bandwidth of a previous time of frequency hopping−n)mod(M); or a sending position index of a partial bandwidth of current frequency hopping=(a sending position index of a partial bandwidth of a previous time of frequency hopping−n)mod(N), where n is an increased value of a sending position index of a partial bandwidth in each complete frequency hopping period or each time of frequency hopping, and n is a positive integer greater than or equal to 1. In some implementations, a value of n is agreed on by a protocol or configured by a network side device, and/or and is related to a value of M or N.

Further, in some implementations, n is equal to 1.

In embodiments of this application, the method further includes: determining a sending position index sequence of partial bandwidths according to indication information sent by a network side device, where the indication information is used for indicating the sending position index sequence of the partial bandwidths.

In embodiments of this application, the sending position index sequence of the partial bandwidths satisfies at least one of the following conditions:

a maximum index value in the sending position index sequence of the partial bandwidths is equal to M or M−1;

a quantity of indexes in the sending position index sequence of the partial bandwidths is not greater than M;

a same index value is configurable in the sending position index sequence of the partial bandwidths; and all index values in the sending position index sequence of the partial bandwidths are different.

In embodiments of this application, a $y^{th}$ index value in the sending position index sequence of the partial bandwidths is used for indicating a sending start position in a partial bandwidth before enabling of partial frequency hopping.

In embodiments of this application, y is a positive integer greater than or equal to 1, and is agreed on by a protocol or configured by a network.

In embodiments of this application, the sending position index sequence of the partial bandwidths takes effect after enabling of partial frequency hopping; or the sending position index sequence of the partial bandwidths takes effect after configuration.

In embodiments of this application, the sending position index sequence of the partial bandwidths is determined according to at least one of the following parameters: a frequency domain position index $N_b$, a value $n_{SRS}$ of an SRS sending position counter, a parameter $b_{hop}$ used for determining whether to perform frequency hopping and a quantity of times of frequency hopping, a complete bandwidth $m_{SRS}{}^b$ of the SRS on one OFDM symbol, an SRS bandwidth sending start position parameter $n_{RRC}$, a frequency hopping index parameter $B_{SRS}$, the quantity M of the sending position indexes of the partial bandwidths in the partial frequency hopping period, a sending position index quantity N, a partial bandwidth factor, and a sending start position in a partial bandwidth.

In embodiments of this application, the SRS is a periodic SRS or a semi-persistent SRS. That is to say, the terminal does not expect that the aperiodic SRS is configured or partial frequency hopping sounding is enabled.

The foregoing SRS sending method of this application is described below with reference to specific embodiments.

Embodiment 1

Figure 3:
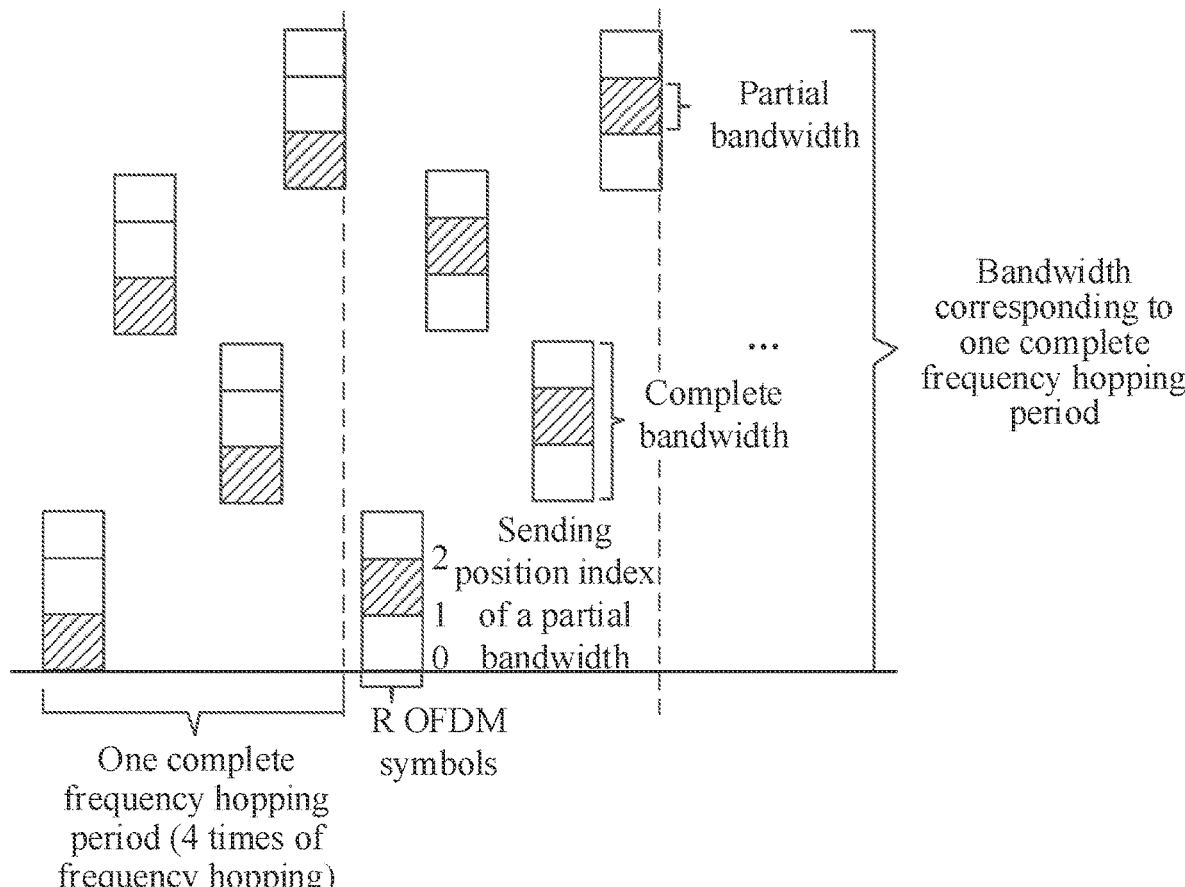
FIG. 3 is a flowchart of an SRS receiving method according to Embodiment 1 of this application.

Referring to FIG. 3, FIG. 3 shows a method for determining a sending position index of a partial bandwidth according to Embodiment 1 of this application. In embodiments of this application, one complete bandwidth corresponding to an OFDM symbol is divided into 3 partial bandwidths, and a terminal determines that a quantity M of sending position indexes of partial bandwidths in a partial frequency hopping period is equal to 2. In addition, the terminal determines a sequence (0, 1) of sending position indexes of partial bandwidths according to a method for increasing index values in forward order, that is, a sending position index of a partial bandwidth of current frequency hopping=(a sending position index of a partial bandwidth of a previous time of frequency hopping+n)mod(M), where n=1. In the embodiment shown in FIG. 3, in each complete frequency hopping period, 4 times of existing frequency hopping (non-partial frequency hopping) are performed, and on each complete bandwidth, a sending position index of each partial bandwidth in each time of frequency hopping is the same. For example, in a first complete frequency hopping period, 4 times of frequency hopping are performed, and a sending position index of each partial bandwidth in each time of frequency hopping is 0; and in a second complete frequency hopping period, 4 times of frequency hopping are performed, and a sending position index of each partial bandwidth in each time of frequency hopping is 1. In adjacent complete frequency hopping periods, sending position indexes of partial bandwidths in frequency hopping are different.

Embodiment 2

Figure 4:
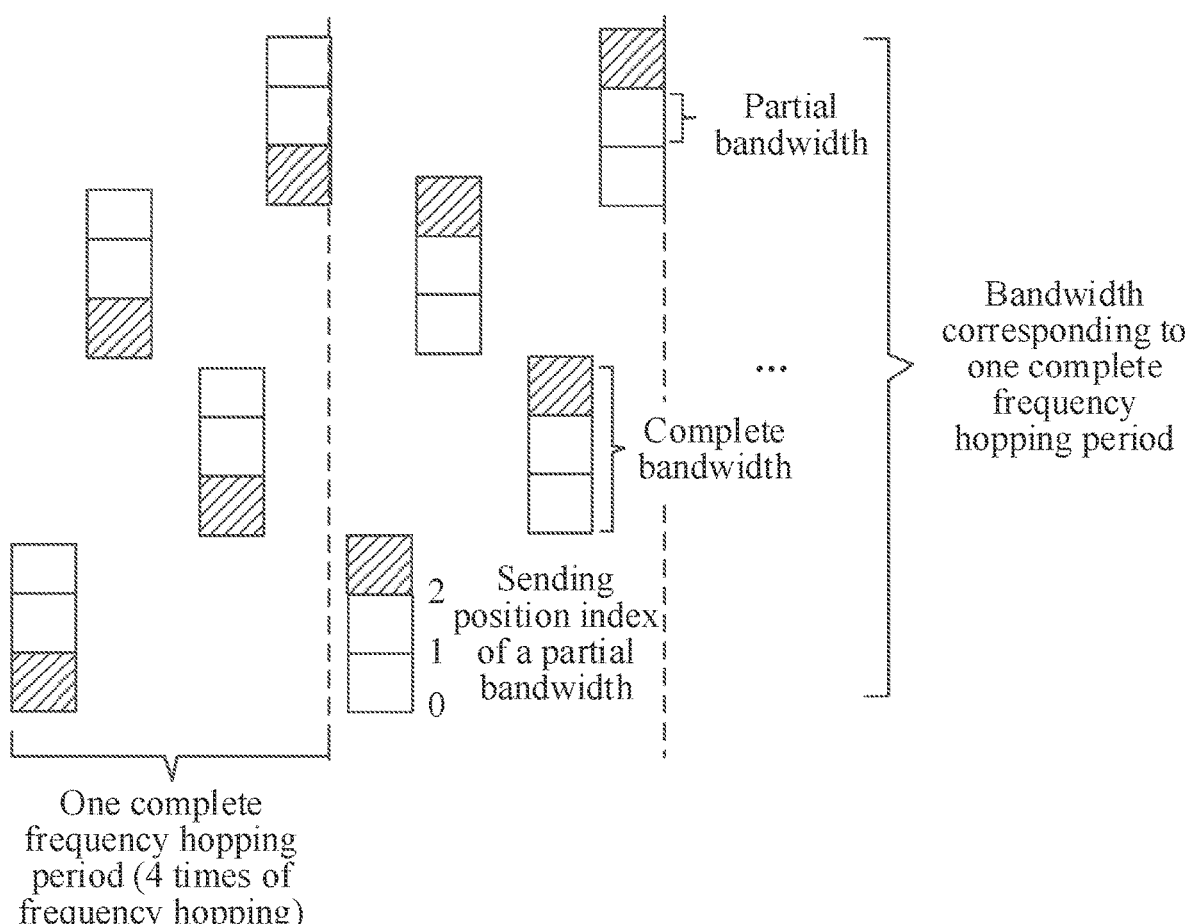
FIG. 4 is a flowchart of an SRS receiving method according to Embodiment 2 of this application.

Referring to FIG. 4, FIG. 4 shows a method for determining a sending position index of a partial bandwidth according to Embodiment 2 of this application. In embodiments of this application, one complete bandwidth corresponding to an OFDM symbol is divided into 3 partial bandwidths, and a terminal determines that a quantity M of sending position indexes of partial bandwidths in a partial frequency hopping period is equal to 3. In addition, the terminal determines a sequence (0, 2, 1) of sending position indexes of partial bandwidths according to a method for reducing index values in reverse order, that is, a sending position index of a partial bandwidth of current frequency hopping=(a sending position index of a partial bandwidth of a previous time of frequency hopping–n)mod(M), where n=1. In the embodiment shown in FIG. 4, in each complete frequency hopping period, 4 times of existing frequency hopping (non-partial frequency hopping) are performed, and on each complete bandwidth, a sending position index of each partial bandwidth in each time of frequency hopping is the same. For example, in a first complete frequency hopping period, 4 times of frequency hopping are performed, and a sending position index of each partial bandwidth in each time of frequency hopping is 1; and in a second complete frequency hopping period, 4 times of frequency hopping are performed, and a sending position index of each partial bandwidth in each time of frequency hopping is 2. In adjacent complete frequency hopping periods, sending position indexes of partial bandwidths in frequency hopping are different.

Embodiment 3

Figure 5:
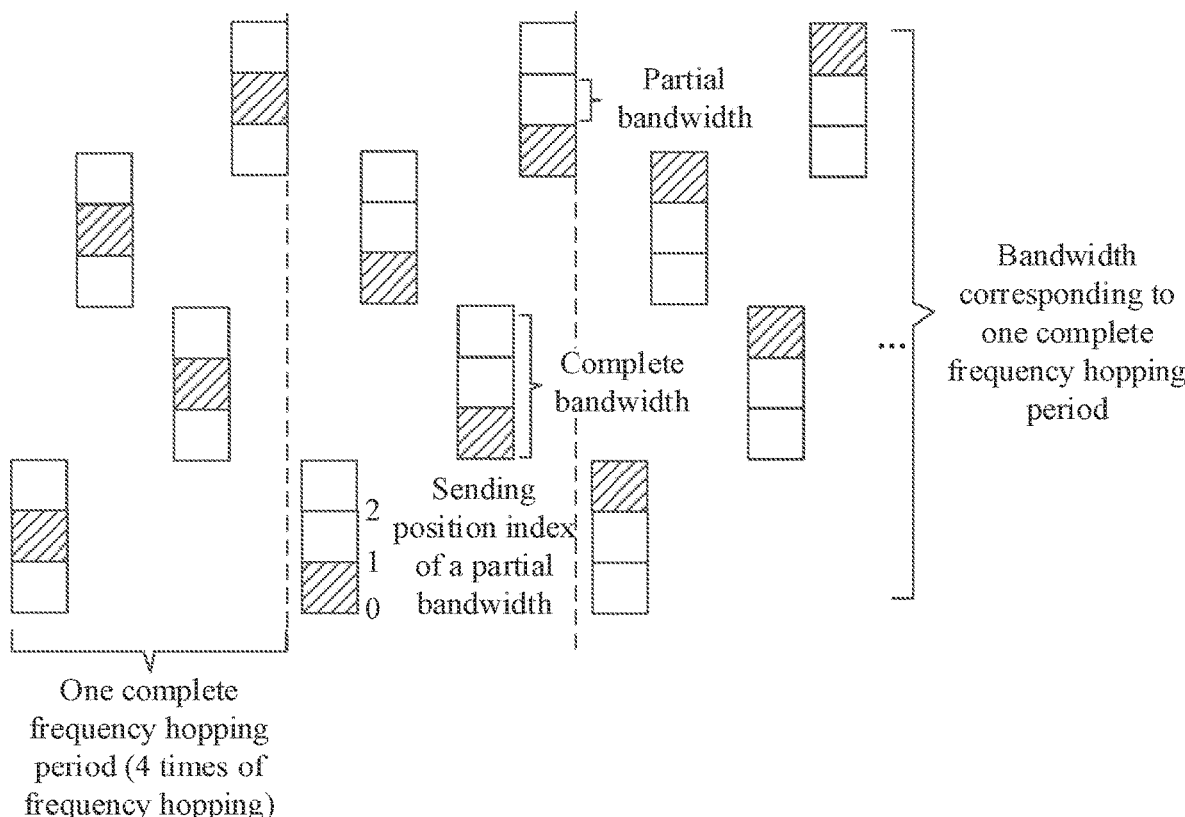
FIG. 5 is a flowchart of an SRS receiving method according to Embodiment 3 of this application.

Referring to FIG. 5, FIG. 5 shows a method for determining a sending position index of a partial bandwidth according to Embodiment 3 of this application. In embodiments of this application, one complete bandwidth corresponding to an OFDM symbol is divided into 3 partial bandwidths, and a terminal determines a sequence (1, 0, 2) of sending position indexes of partial bandwidths according to an indication of a network side device. In the embodiment shown in FIG. 5, in each complete frequency hopping period, 4 times of existing frequency hopping (non-partial frequency hopping) are performed, and on each complete bandwidth, a sending position index of each partial bandwidth in each time of frequency hopping is the same. For example, in a first complete frequency hopping period, 4 times of frequency hopping are performed, and a sending position index of each partial bandwidth in each time of frequency hopping is 1; in a second complete frequency hopping period, 4 times of frequency hopping are performed, and a sending position index of each partial bandwidth in each time of frequency hopping is 0; and in a third complete frequency hopping period, 4 times of frequency hopping are performed, and a sending position index of each partial bandwidth in each time of frequency hopping is 2. In adjacent complete frequency hopping periods, sending position indexes of partial bandwidths in frequency hopping are different.

Embodiment 4

Figure 6:
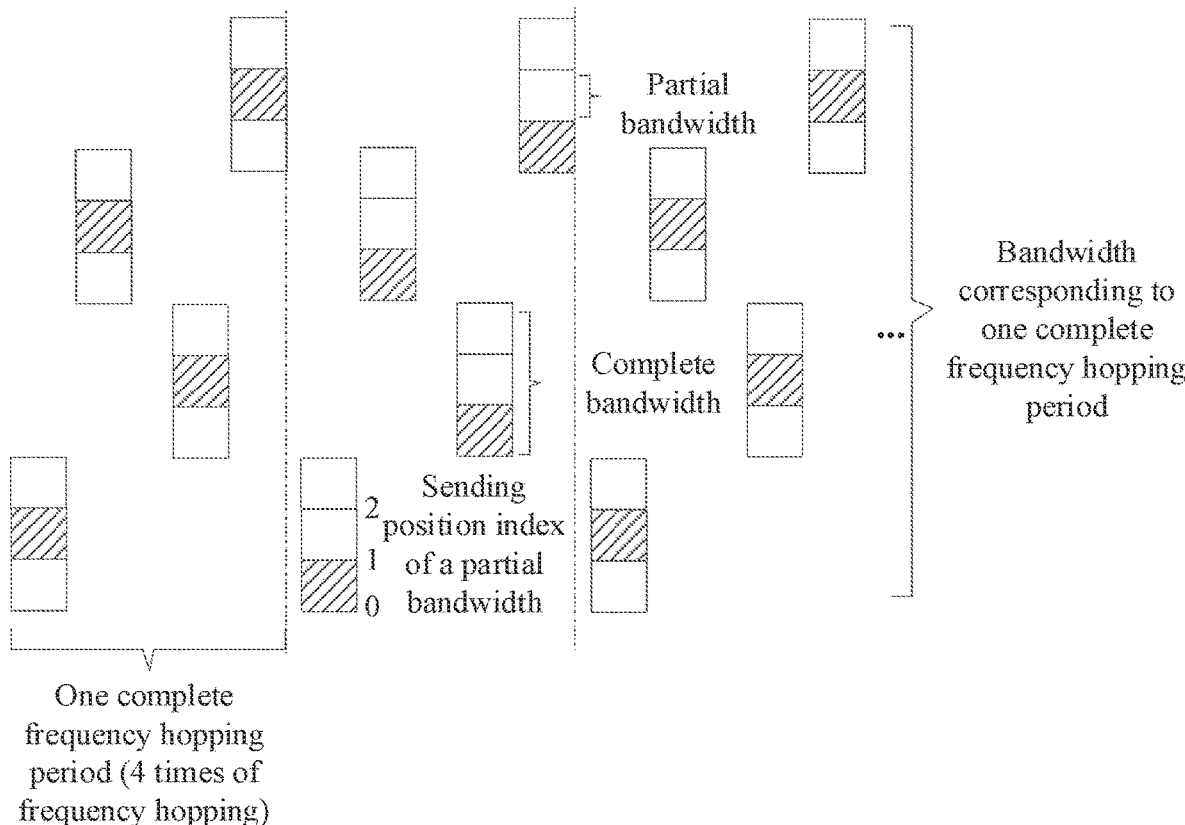
FIG. 6 is a flowchart of an SRS receiving method according to Embodiment 4 of this application.

Referring to FIG. 6, FIG. 6 shows a method for determining a sending position index of a partial bandwidth according to Embodiment 4 of this application. In embodiments of this application, one complete bandwidth corresponding to an OFDM symbol is divided into 3 partial bandwidths, and a terminal determines a sequence (1, 0) of sending position indexes of partial bandwidths according to an indication of a network side device. In the embodiment shown in FIG. 6, in each complete frequency hopping period, 4 times of existing frequency hopping (non-partial frequency hopping) are performed, and on each complete bandwidth, a sending position index of each partial bandwidth in each time of frequency hopping is the same. For example, in a first complete frequency hopping period, 4 times of frequency hopping are performed, and a sending position index of each partial bandwidth in each time of frequency hopping is 1; in a second complete frequency hopping period, 4 times of frequency hopping are performed, and a sending position index of each partial bandwidth in each time of frequency hopping is 0; and in a third complete frequency hopping period, 4 times of frequency hopping are performed, and a sending position index of each partial bandwidth in each time of frequency hopping is 1. In adjacent complete frequency hopping periods, sending position indexes of partial bandwidths in frequency hopping are different.

Embodiment 5

Figure 7:
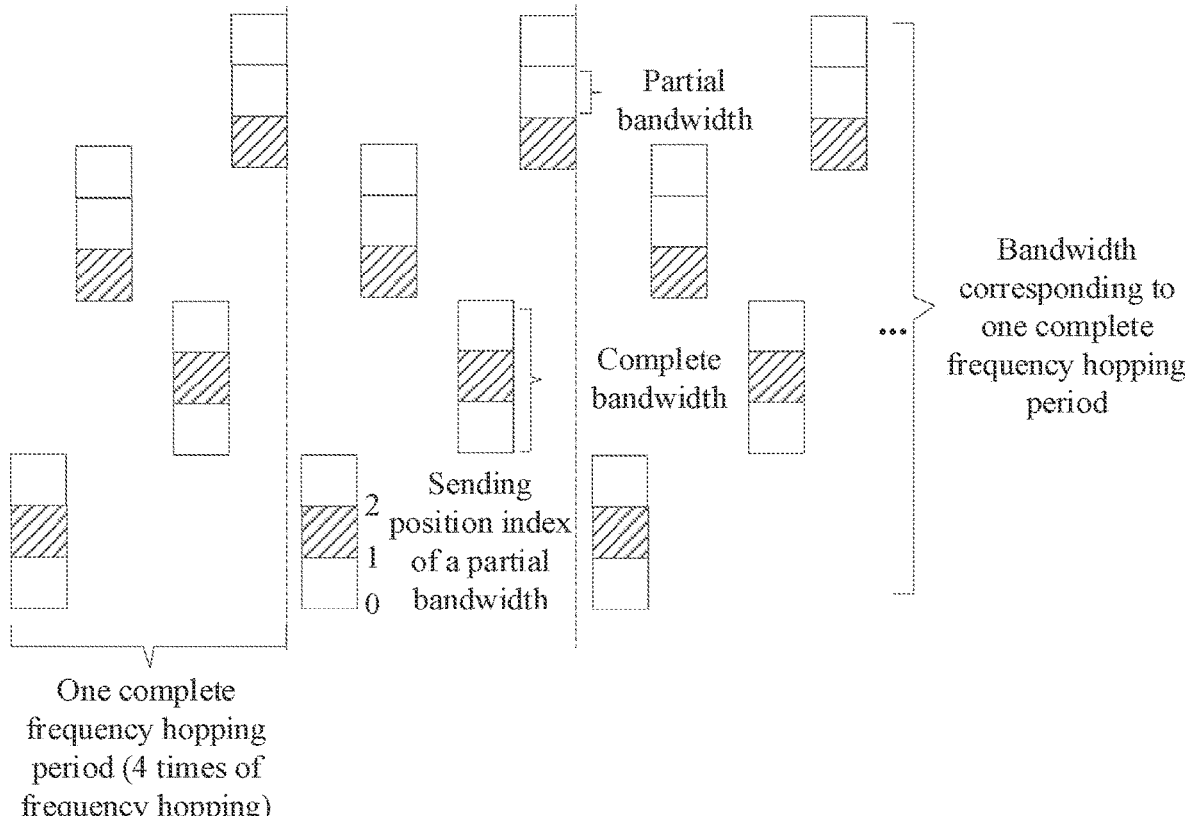
FIG. 7 is a flowchart of an SRS receiving method according to Embodiment 5 of this application.

Referring to FIG. 7, FIG. 7 shows a method for determining a sending position index of a partial bandwidth according to Embodiment 5 of this application. In embodiments of this application, one complete bandwidth corresponding to an OFDM symbol is divided into 3 partial bandwidths, and a terminal determines a sequence (1, 0) of sending position indexes of partial bandwidths according to an indication of a network side device. In the embodiment shown in FIG. 7, in each complete frequency hopping period, 4 times of frequency hopping are performed, and on each complete bandwidth, sending position indexes of partial bandwidths in adjacent frequency hopping are different. For example, in a first complete frequency hopping period, 4 times of frequency hopping are performed, where a sending position index of each partial bandwidth in a first time of frequency hopping is 1, a sending position index of each partial bandwidth in a second time of frequency hopping is 0, a sending position index of each partial bandwidth in a third time of frequency hopping is 1, and a sending position index of each partial bandwidth in a fourth time of frequency hopping is 0.

Embodiment 6

Figure 8:
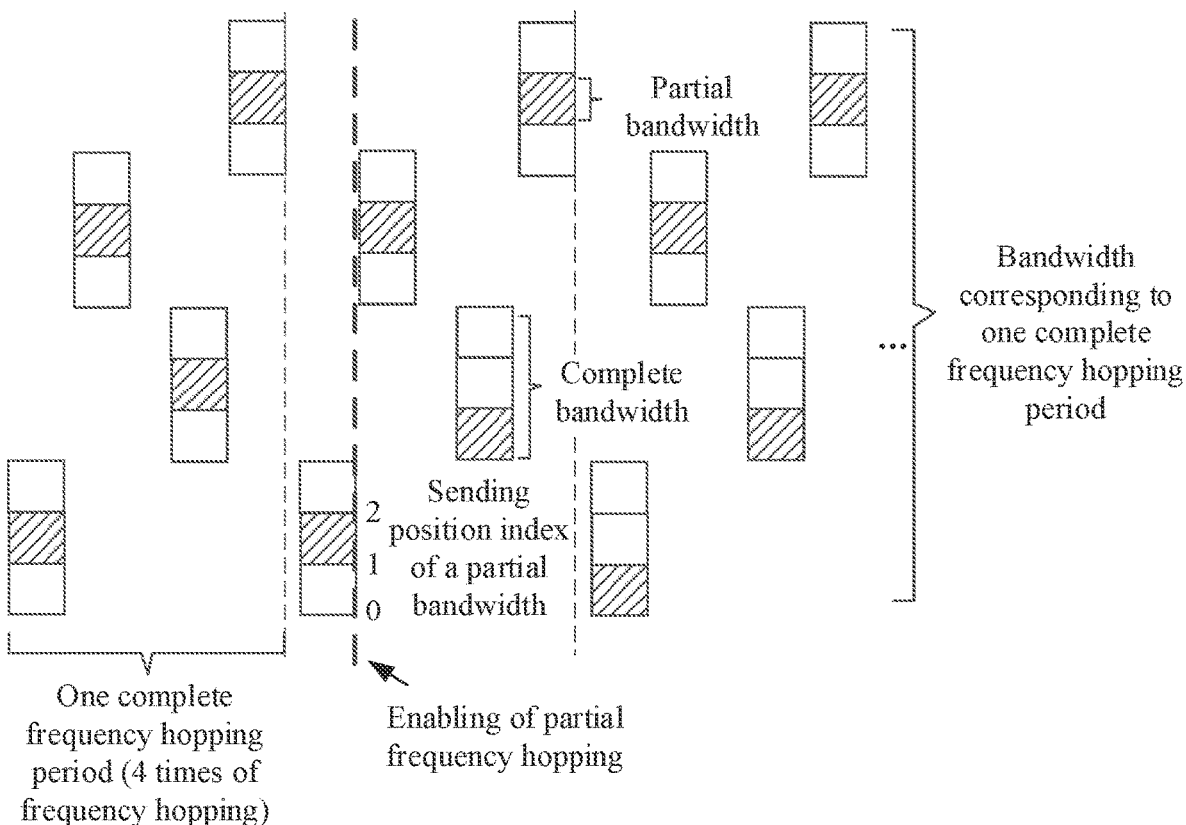
FIG. 8 is a flowchart of an SRS receiving method according to Embodiment 6 of this application.

Referring to FIG. 8, FIG. 8 shows a method for determining a sending position index of a partial bandwidth according to Embodiment 6 of this application. In embodiments of this application, one complete bandwidth corresponding to an OFDM symbol is divided into 3 partial bandwidths, and a terminal determines a sequence (1, 0) of sending position indexes of partial bandwidths according to an indication of a network side device. A start position index of partial frequency hopping is 1, and starts taking effect after enabling of partial frequency hopping.

Embodiment 7

Figure 9:
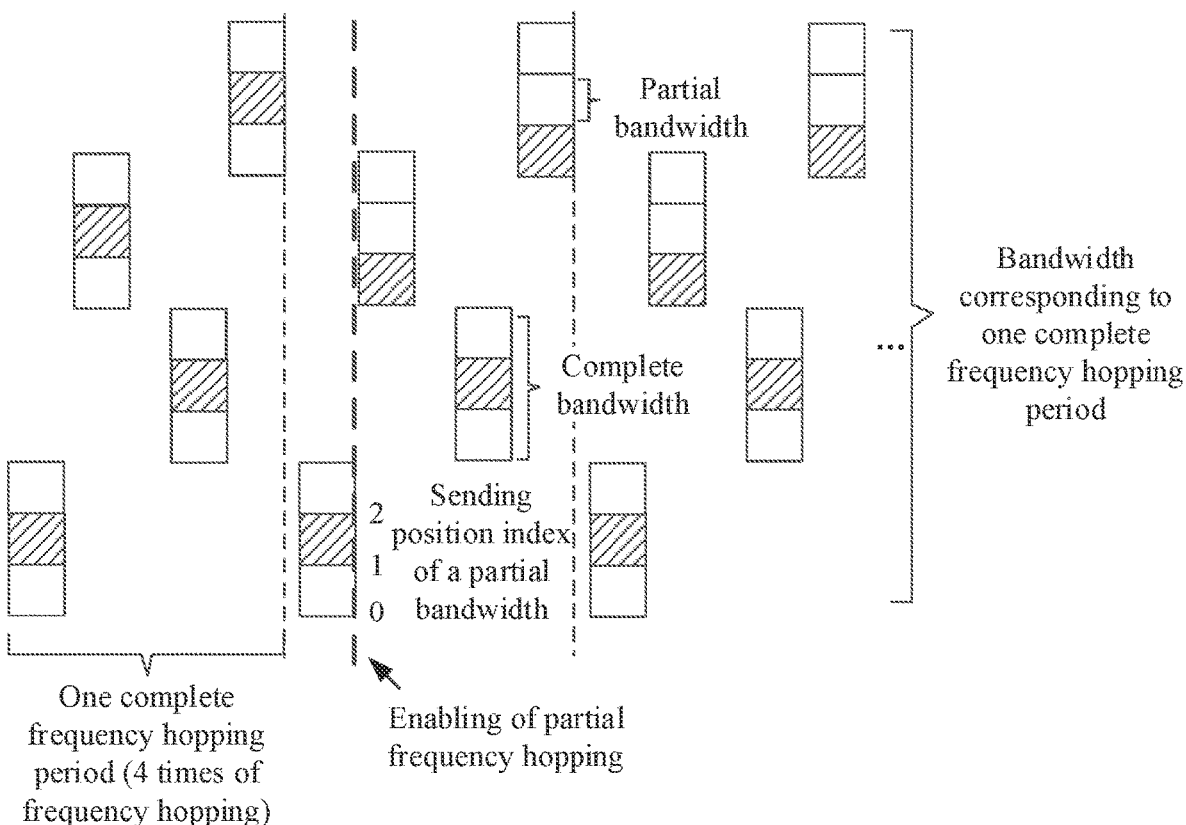
FIG. 9 is a flowchart of an SRS receiving method according to Embodiment 7 of this application.

Referring to FIG. 9, FIG. 9 shows a method for determining a sending position index of a partial bandwidth according to Embodiment 7 of this application. In embodiments of this application, one complete bandwidth corresponding to an OFDM symbol is divided into 3 partial bandwidths, and a terminal determines a sequence (1, 0) of sending position indexes of partial bandwidths according to an indication of a network side device. A start position index of partial frequency hopping is 1, and takes effect as soon as the partial frequency hopping is configured.

Referring to FIG. 10, an embodiment of this application further provides an SRS receiving method, including:

Step 101: A network side device receives an SRS sent by a terminal in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

Referring to FIG. 11, an embodiment of this application further provides an SRS sending method, including:

Step 111: A terminal obtains configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

Step 112: The terminal sends an SRS according to the configuration information.

In embodiments of this application, the network side device flexibly indicates the partial bandwidth related parameter, thereby sending the SRS according to the indicated partial bandwidth related parameter.

In embodiments of this application, the network side device flexibly indicates the partial bandwidth related parameter, thereby sending the SRS according to the indicated partial bandwidth related parameter.

In embodiments of this application, the method further includes:

receiving, by the terminal, first indication information, where the first indication information is used for indicating one target parameter value from the at least one parameter value configured for the partial bandwidth related parameter, where the sending, by the terminal, an SRS according to the configuration information includes: sending, by the terminal, the SRS according to the target parameter value.

In embodiments of this application, the first indication information is carried by DCI.

In some embodiments, a time domain type corresponding to the SRS resource set or SRS resource is an aperiodic type, the SRS resource set or SRS resource includes at least one trigger state, and each trigger state is able to be associated with at least one parameter value of at least one partial bandwidth related parameter; and the DCI chooses, through an SRS request field, to trigger the SRS resource set or the SRS resource for which a target trigger state is correspondingly configured.

In some implementations, the sending, by the terminal, an SRS according to the configuration information includes:

sending, by the terminal if the target trigger state is associated with the partial bandwidth related parameter, the SRS according to the at least one parameter value of the at least one partial bandwidth related parameter associated with the trigger state.

In some implementations, if at least two parameter values are configured for the partial bandwidth related parameter associated with the target trigger state, the DCI is further used for indicating one target parameter value from at least two parameter values configured for the partial bandwidth related parameter through a first field, and the first field and the SRS request field are different fields;

or one of the at least two parameter values configured for the partial bandwidth related parameter is agreed on by a protocol as a target parameter value.

In some implementations, the method further includes:

determining, by the terminal if the target trigger state is not associated with the partial bandwidth related parameter, that a partial bandwidth sounding function is not enabled.

In some other embodiments, a time domain type corresponding to the SRS resource set or SRS resource is an aperiodic type;

the DCI chooses, through an SRS request field, to trigger a target aperiodic SRS in the SRS resource set or SRS resource; and each code point of the SRS request field is able to be associated with at least one parameter value of at least one partial bandwidth related parameter.

In some implementations, the sending, by the terminal, an SRS according to the configuration information includes:

sending, by the terminal if the SRS request field used for triggering the target aperiodic SRS is associated with the partial bandwidth related parameter, the SRS according to the at least one parameter value of the at least one partial bandwidth related parameter associated with the SRS request field.

In some implementations, if at least two parameter values are configured for the partial bandwidth related parameter associated with the SRS request field used for triggering the target aperiodic SRS, the DCI is further used for indicating one target parameter value from at least two parameter values configured for the partial bandwidth related parameter through a first field, and the first field and the aperiodic SRS request field are different fields;

or one of the at least two parameter values configured for the partial bandwidth related parameter is agreed on by a protocol as a target parameter value.

In embodiments of this application, if a value of the SRS request field is equal to 0, it indicates that a code point of an aperiodic SRS is not activated and an association relationship between the code point of the aperiodic SRS and the partial bandwidth related parameter is not configured.

In embodiments of this application, the first indication information is carried by a MAC CE.

In embodiments of this application, when the SRS indicated by the SRS resource set or SRS resource is a semi-persistent SRS, the MAC CE is a MAC CE for activating or deactivating the semi-persistent SRS.

In the foregoing embodiments of this application, the method further includes:

receiving, by the terminal, update information of the configuration information of the partial bandwidth related parameter, where the update information is used for updating a parameter value of the partial bandwidth related parameter.

In embodiments of this application, the update information is carried by a MAC CE.

In the foregoing embodiments of this application, if only one parameter value is configured for the partial bandwidth related parameter, the sending, by the terminal, an SRS according to the configuration information includes: sending, by the terminal, the SRS according to the parameter value of the partial bandwidth related parameter configured in the configuration information.

In embodiments of this application, if at least two SRS resource sets or SRS resources satisfy one of the following conditions, a same parameter value is configured for at least one partial bandwidth related parameter of the at least two SRS resource sets or SRS resources:

the at least two SRS resource sets or SRS resources belong to a same cell;

the at least two SRS resource sets or SRS resources belong to a same carrier;

the at least two SRS resource sets or SRS resources belong to a same terminal;

bandwidth sizes of the at least two SRS resource sets or SRS resources are the same;

bandwidth frequency domain start positions of the at least two SRS resource sets or SRS resources are the same; and each of the at least two SRS resource sets or SRS resources supports a terminal with a partial bandwidth sounding capability.

In some implementations, partial bandwidth factors of the at least two SRS resource sets or SRS resources are configured as a same parameter value.

Referring to FIG. 12, an embodiment of this application further provides an SRS configuration method, including:

Step 121: A network side device sends configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

In embodiments of this application, the network side device flexibly indicates the partial bandwidth related parameter, thereby sending the SRS according to the indicated partial bandwidth related parameter.

In embodiments of this application, the method further includes: sending, by the network side device, first indication information, where the first indication information is used for indicating one target parameter value from the at least one parameter value configured for the partial bandwidth related parameter.

In embodiments of this application, the first indication information is carried by DCI.

In embodiments of this application, a time domain type corresponding to the SRS resource set or SRS resource is an aperiodic type, the SRS resource set or SRS resource includes at least one trigger state trigger state, and each trigger state is able to be associated with at least one parameter value of at least one partial bandwidth related parameter; and the DCI chooses, through an SRS request field, to trigger the SRS resource set or the SRS resource for which a target trigger state is correspondingly configured.

In embodiments of this application, if at least two parameter values are configured for the partial bandwidth related parameter associated with the target trigger state, the DCI is further used for indicating one target parameter value from at least two parameter values configured for the partial bandwidth related parameter through a first field, and the first field and the SRS request field are different fields;

or one of the at least two parameter values configured for the partial bandwidth related parameter is agreed on by a protocol as a target parameter value.

In embodiments of this application, a time domain type corresponding to the SRS resource set or SRS resource is an aperiodic type;

the DCI chooses, through an SRS request field, to trigger a target aperiodic SRS in the SRS resource set or SRS resource; and each code point of the SRS request field is able to be associated with at least one parameter value of at least one partial bandwidth related parameter.

In embodiments of this application, if at least two parameter values are configured for the partial bandwidth related parameter associated with the SRS request field used for triggering the target aperiodic SRS, the DCI is further used for indicating one target parameter value from at least two parameter values configured for the partial bandwidth related parameter through a first field, and the first field and the aperiodic SRS request field are different fields;

or one of the at least two parameter values configured for the partial bandwidth related parameter is agreed on by a protocol as a target parameter value.

In embodiments of this application, the first indication information is carried by a MAC CE.

In embodiments of this application, when the SRS indicated by the SRS resource set or SRS resource is a semi-persistent SRS, the MAC CE is a MAC CE for activating or deactivating the semi-persistent SRS.

In embodiments of this application, the method further includes:

sending, by the network side device, update information of the configuration information of the partial bandwidth related parameter, where the update information is used for updating a parameter value of the partial bandwidth related parameter.

In embodiments of this application, the update information is carried by a MAC CE.

In embodiments of this application, if at least two SRS resource sets or SRS resources satisfy one of the following conditions, a same parameter value is configured for at least one partial bandwidth related parameter of the at least two SRS resource sets or SRS resources:

the at least two SRS resource sets or SRS resources belong to a same cell;

the at least two SRS resource sets or SRS resources belong to a same carrier;

the at least two SRS resource sets or SRS resources belong to a same terminal;

bandwidth sizes of the at least two SRS resource sets or SRS resources are the same;

bandwidth frequency domain start positions of the at least two SRS resource sets or SRS resources are the same; and each of the at least two SRS resource sets or SRS resources supports a terminal with a partial bandwidth sounding capability.

It should be noted that an execution body of the SRS sending method provided in the embodiments of this application may be an SRS sending apparatus or a control module configured to send an SRS in the SRS sending apparatus. In the embodiments of this application, the SRS sending apparatus provided in the embodiments of this application is described using an example in which the SRS sending apparatus performs the SRS sending method.

Figure 13:
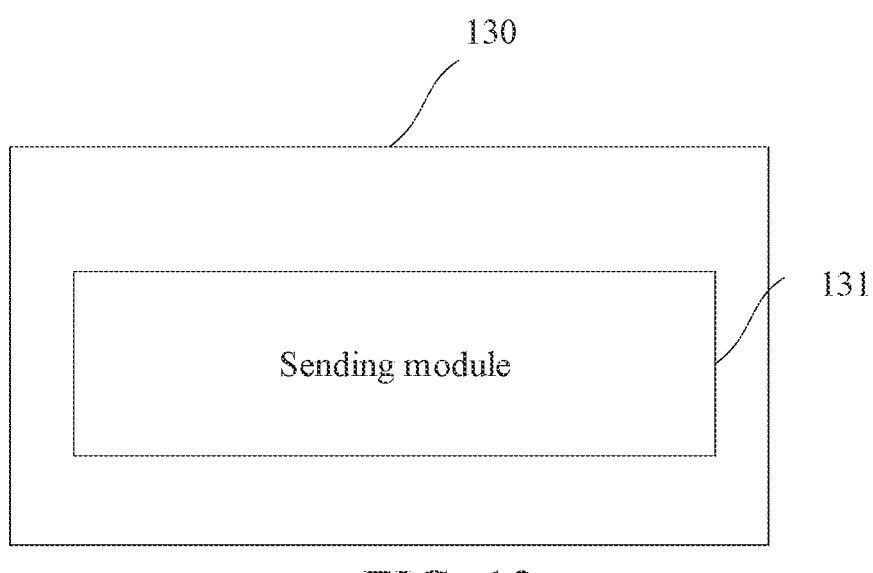
FIG. 13 is a block diagram of an SRS sending apparatus according to an embodiment of this application.

Referring to FIG. 13, an embodiment of this application further provides an SRS sending apparatus 130, including:

a sending module 131, configured to send an SRS in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

In embodiments of this application, a terminal can send an SRS on a partial bandwidth of a complete bandwidth, and sending position indexes of partial bandwidths of at least two complete bandwidths are different, thereby helping the terminal obtain complete channel characteristics.

In some implementations, the sending module 131 is configured to send an SRS according to at least one of sending position indexes of partial bandwidths, a quantity M of sending position indexes of partial bandwidths in a partial frequency hopping period, a partial frequency hopping rule, and a sending position index sequence of partial bandwidths, where M is less than or equal to N.

In some implementations, M satisfies one of the following conditions:

M is equal to N, where N is a quantity of sending position indexes of partial bandwidths determined from the complete bandwidths corresponding to the R OFDM symbols, and N is a positive integer greater than or equal to 1;

if N partial bandwidth sizes corresponding to the N sending position indexes of the partial bandwidths are same, M is equal to N;

if N partial bandwidth sizes corresponding to the N sending position indexes of the partial bandwidths are not completely the same, M is equal to $N_1$, where $N_1$ is a quantity of sending position indexes corresponding to a maximum partial bandwidth size in the N partial bandwidths corresponding to the N sending position indexes of the partial bandwidths;

if N partial bandwidth sizes corresponding to the N sending position indexes of the partial bandwidths are not completely the same, M is equal to $N_2$, where $N_2$ is a quantity of sending position indexes corresponding to a minimum partial bandwidth size in the N partial bandwidths corresponding to the N sending position indexes of the partial bandwidths; and M is less than or equal to N, and is indicated by a network side device.

In some implementations, N is determined based on at least one of the following parameters: a partial bandwidth factor, a complete bandwidth size, and a partial bandwidth size.

In some implementations, the SRS sending apparatus 130 further includes:

an obtaining module, configured to obtain configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

In some implementations, the SRS sending apparatus 130 further includes:

a first receiving module, configured to receive first indication information, where the first indication information is used for indicating one target parameter value from the at least one parameter value configured for the partial bandwidth related parameter.

In some implementations, in one complete frequency hopping period, a sending position index of each partial bandwidth with frequency hopping enabled is the same.

In some implementations, a frequency hopping start position in a partial bandwidth in one complete frequency hopping period is a frequency domain position determined according to a start position of a first time of frequency hopping agreed on by a protocol;

or a frequency hopping start position in a partial bandwidth in one complete frequency hopping period is a frequency domain position determined according to X symbols or slots after enabling of partial frequency hopping.

In some implementations, in adjacent complete frequency hopping periods, sending position indexes of partial bandwidths with frequency hopping enabled are different.

In some implementations, sending position indexes of adjacent partial bandwidths are different.

In some implementations, the SRS sending apparatus 130 further includes:

a second receiving module, configured to receive partial frequency hopping enabling signaling, where the partial frequency hopping enabling signaling is used for indicating whether the terminal, one SRS resource set, or one SRS resource enables partial frequency hopping.

In some implementations, the partial frequency hopping enabling signaling is DCI, a MAC CE, or RRC signaling.

In some implementations, the sending an SRS in a partial frequency hopping manner on a complete bandwidth corresponding to R OFDM symbols in one SRS resource includes one of the following:

sending an SRS in the partial frequency hopping manner in X symbols or slots after receiving of the partial frequency hopping enabling signaling; and sending an SRS in the partial frequency hopping manner in X symbols or slots after reporting of ACK or NACK feedback after receiving of the partial frequency hopping enabling signaling.

In some implementations, the partial frequency hopping rule is increasing index values in forward order or reducing index values in reverse order.

In some implementations, the partial frequency hopping rule is:

a sending position index of a partial bandwidth of current frequency hopping=(a sending position index of a partial bandwidth of a previous time of frequency hopping+n)mod(M);

or a sending position index of a partial bandwidth of current frequency hopping=(a sending position index of a partial bandwidth of a previous time of frequency hopping+n)mod(N);

or a sending position index of a partial bandwidth of current frequency hopping=(a sending position index of a partial bandwidth of a previous time of frequency hopping−n)mod(M);

or a sending position index of a partial bandwidth of current frequency hopping=(a sending position index of a partial bandwidth of a previous time of frequency hopping−n)mod(N), where n is an increased value of a sending position index of a partial bandwidth in each complete frequency hopping period or each time of frequency hopping.

In some implementations, the SRS sending apparatus 130 further includes:

a second determining module, configured to determine a sending position index sequence of partial bandwidths according to indication information sent by a network side device, where the indication information is used for indicating the sending position index sequence of the partial bandwidths.

In some implementations, the sending position index sequence of the partial bandwidths satisfies at least one of the following conditions:

a maximum index value in the sending position index sequence of the partial bandwidths is equal to M or M−1;

a quantity of indexes in the sending position index sequence of the partial bandwidths is not greater than M;

a same index value is configurable in the sending position index sequence of the partial bandwidths; and all index values in the sending position index sequence of the partial bandwidths are different.

In some implementations, a $y^{th}$ index value in the sending position index sequence of the partial bandwidths is used for indicating a sending start position in a partial bandwidth before enabling of partial frequency hopping.

In some implementations, y is a positive integer greater than or equal to 1, and is agreed on by a protocol or configured by a network.

In some implementations, the sending position index sequence of the partial bandwidths takes effect after enabling of partial frequency hopping;

or the sending position index sequence of the partial bandwidths takes effect after configuration.

In some implementations, the sending position index sequence of the partial bandwidths is determined according to at least one of the following parameters: a frequency domain position index $N_b$, a value $n_{SRS}$ of an SRS sending position counter, a parameter $b_{hop}$ used for determining whether to perform frequency hopping and a quantity of times of frequency hopping, a complete bandwidth $m_{SRS^b}$ of the SRS on one OFDM symbol, an SRS bandwidth sending start position parameter $n_{RRC}$, a frequency hopping index parameter $B_{SRS}$, the quantity M of the sending position indexes of the partial bandwidths in the partial frequency hopping period, a sending position index quantity N, a partial bandwidth factor, and a sending start position in a partial bandwidth.

In some implementations, the SRS is a periodic SRS or a semi-persistent SRS.

The SRS sending apparatus provided in embodiments of this application can implement each process implemented in the method embodiment of FIG. 2, and achieve the same technical effect. To avoid repetition, details are not described herein again.

Figure 14:
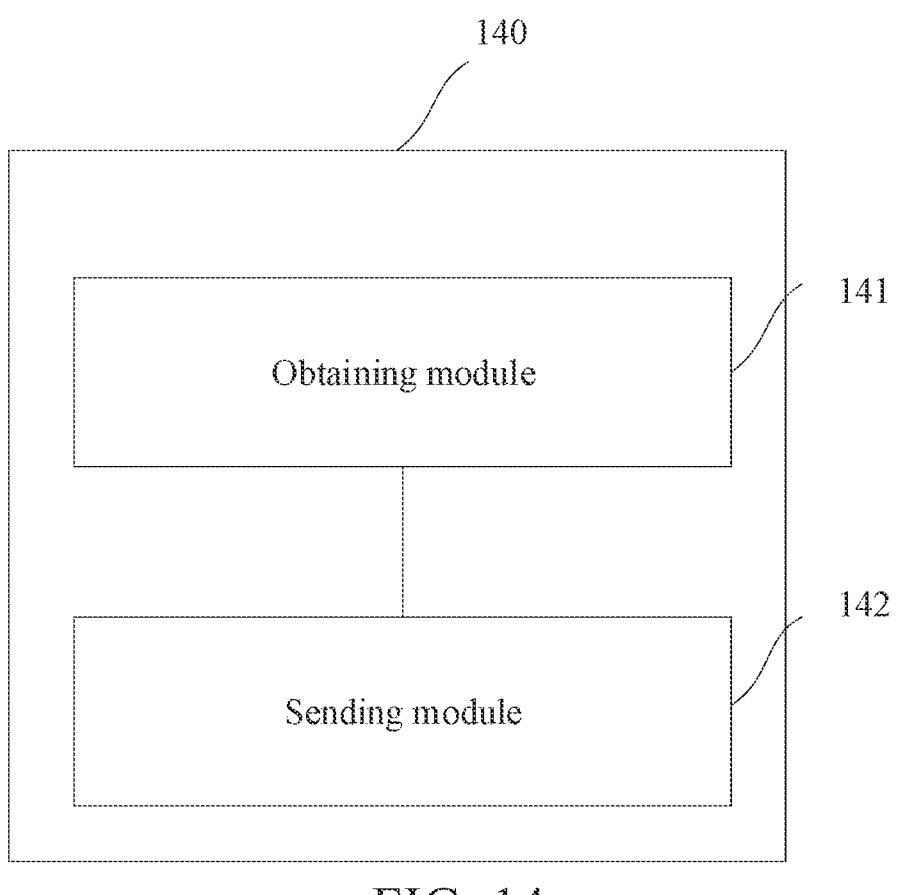
FIG. 14 is a block diagram of an SRS sending apparatus according to another embodiment of this application.

Referring to FIG. 14, an embodiment of this application further provides an SRS sending apparatus 140, including:

an obtaining module 141, configured to obtain configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter; and a sending module 142, configured to send an SRS according to the configuration information.

In embodiments of this application, the network side device flexibly indicates the partial bandwidth related parameter, thereby sending the SRS according to the indicated partial bandwidth related parameter.

In some implementations, the SRS sending apparatus 140 further includes:

a first receiving module, configured to receive first indication information, where the first indication information is used for indicating one target parameter value from the at least one parameter value configured for the partial bandwidth related parameter, where the sending module 142 is configured to send the SRS according to the target parameter value.

In some implementations, the first indication information is carried by DCI.

In some implementations, a time domain type corresponding to the SRS resource set or SRS resource is an aperiodic type, the SRS resource set or SRS resource includes at least one trigger state trigger state, and each trigger state is able to be associated with at least one parameter value of at least one partial bandwidth related parameter; and the DCI chooses, through an SRS request field, to trigger the SRS resource set or the SRS resource for which a target trigger state is correspondingly configured.

In some implementations, the sending module 142 is configured to send, if the target trigger state is associated with the partial bandwidth related parameter, the SRS according to the at least one parameter value of the at least one partial bandwidth related parameter associated with the trigger state.

In some implementations, if at least two parameter values are configured for the partial bandwidth related parameter associated with the target trigger state, the DCI is further used for indicating one target parameter value from at least two parameter values configured for the partial bandwidth related parameter through a first field, and the first field and the SRS request field are different fields;

or one of the at least two parameter values configured for the partial bandwidth related parameter is agreed on by a protocol as a target parameter value.

In some implementations, the SRS sending apparatus 140 further includes:

a determining module, configured to determine, if the target trigger state is not associated with the partial bandwidth related parameter, that a partial bandwidth sounding function is not enabled.

In some implementations, a time domain type corresponding to the SRS resource set or SRS resource is an aperiodic type;

the DCI chooses, through an SRS request field, to trigger a target aperiodic SRS in the SRS resource set or SRS resource; and each code point of the SRS request field is able to be associated with at least one parameter value of at least one partial bandwidth related parameter.

In some implementations, the sending module 142 is configured to send, if the SRS request field used for triggering the target aperiodic SRS is associated with the partial bandwidth related parameter, the SRS according to the at least one parameter value of the at least one partial bandwidth related parameter associated with the SRS request field.

In some implementations, if at least two parameter values are configured for the partial bandwidth related parameter associated with the SRS request field used for triggering the target aperiodic SRS, the DCI is further used for indicating one target parameter value from at least two parameter values configured for the partial bandwidth related parameter through a first field, and the first field and the aperiodic SRS request field are different fields;

or one of the at least two parameter values configured for the partial bandwidth related parameter is agreed on by a protocol as a target parameter value.

In some implementations, the first indication information is carried by a MAC CE.

In some implementations, when the SRS indicated by the SRS resource set or SRS resource is a semi-persistent SRS, the MAC CE is a MAC CE for activating or deactivating the semi-persistent SRS.

In some implementations, the SRS sending apparatus 140 further includes:

a second receiving module, configured to receive update information of the configuration information of the partial bandwidth related parameter, where the update information is used for updating a parameter value of the partial bandwidth related parameter.

In some implementations, the update information is carried by a MAC CE.

In some implementations, if only one parameter value is configured for the partial bandwidth related parameter, the sending module 142 is configured to send the SRS according to the parameter value of the partial bandwidth related parameter configured in the configuration information.

In some implementations, if at least two SRS resource sets or SRS resources satisfy one of the following conditions, a same parameter value is configured for at least one partial bandwidth related parameter of the at least two SRS resource sets or SRS resources:

the at least two SRS resource sets or SRS resources belong to a same cell;

the at least two SRS resource sets or SRS resources belong to a same carrier;

the at least two SRS resource sets or SRS resources belong to a same terminal;

bandwidth sizes of the at least two SRS resource sets or SRS resources are the same;

bandwidth frequency domain start positions of the at least two SRS resource sets or SRS resources are the same; and each of the at least two SRS resource sets or SRS resources supports a terminal with a partial bandwidth sounding capability.

The SRS sending apparatus in embodiments of this application may be an apparatus, an apparatus with an operating system, or an electronic device, or may be a component, an integrated circuit, or a chip in a terminal. The apparatus or electronic device may be a mobile terminal, or may be a non-mobile terminal. For example, the mobile terminal may include but is not limited to the foregoing listed types of the terminal 11, and the non-mobile terminal may be a server, a Network Attached Storage (NAS), a personal computer, a television, a teller machine, or a self-service machine, which is not specifically limited in the embodiments of this application.

The SRS sending apparatus provided in embodiments of this application can implement each process implemented in the method embodiment of FIG. 4, and achieve the same technical effect. To avoid repetition, details are not described herein again.

Figure 15:
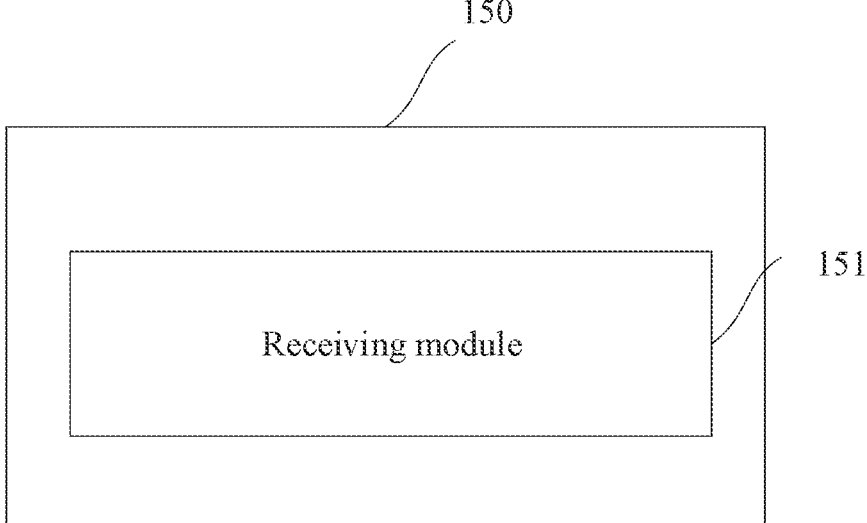
FIG. 15 is a block diagram of an SRS receiving apparatus according to an embodiment of this application.

Referring to FIG. 15, an embodiment of this application further provides an SRS receiving apparatus 150, including:

a receiving module 151, configured to receive an SRS sent by a terminal in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

In embodiments of this application, a terminal can send an SRS on a partial bandwidth of a complete bandwidth, and sending position indexes of partial bandwidths of at least two complete bandwidths are different, thereby helping the terminal obtain complete channel characteristics.

Figure 16:
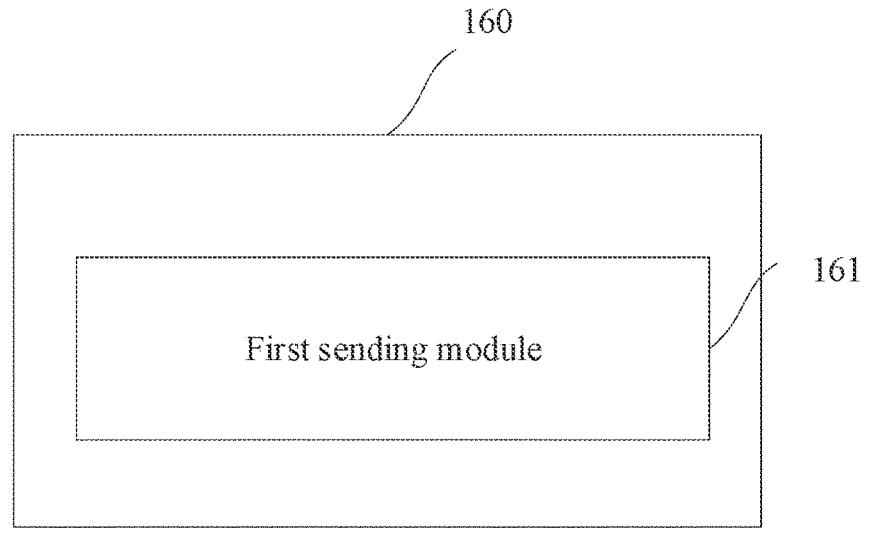
FIG. 16 is a block diagram of an SRS configuration apparatus according to an embodiment of this application.

Referring to FIG. 16, an embodiment of this application further provides an SRS configuration apparatus 160, including:

a first sending module 161, configured to send configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

In embodiments of this application, the network side device flexibly indicates the partial bandwidth related parameter, thereby sending the SRS according to the indicated partial bandwidth related parameter.

In some implementations, the SRS configuration apparatus 160 further includes:

a second sending module, configured to send first indication information, where the first indication information is used for indicating one target parameter value from the at least one parameter value configured for the partial bandwidth related parameter.

In some implementations, the first indication information is carried by DCI.

In some implementations, a time domain type corresponding to the SRS resource set or SRS resource is an aperiodic type, the SRS resource set or SRS resource includes at least one trigger state trigger state, and each trigger state is able to be associated with at least one parameter value of at least one partial bandwidth related parameter; and the DCI chooses, through an SRS request field, to trigger the SRS resource set or the SRS resource for which a target trigger state is correspondingly configured.

In some implementations, if at least two parameter values are configured for the partial bandwidth related parameter associated with the target trigger state, the DCI is further used for indicating one target parameter value from at least two parameter values configured for the partial bandwidth related parameter through a first field, and the first field and the SRS request field are different fields;

or one of the at least two parameter values configured for the partial bandwidth related parameter is agreed on by a protocol as a target parameter value.

In some implementations, a time domain type corresponding to the SRS resource set or SRS resource is an aperiodic type;

the DCI chooses, through an SRS request field, to trigger a target aperiodic SRS in the SRS resource set or SRS resource; and each code point of the SRS request field is able to be associated with at least one parameter value of at least one partial bandwidth related parameter.

In some implementations, if at least two parameter values are configured for the partial bandwidth related parameter associated with the SRS request field used for triggering the target aperiodic SRS, the DCI is further used for indicating one target parameter value from at least two parameter values configured for the partial bandwidth related parameter through a first field, and the first field and the aperiodic SRS request field are different fields;

or one of the at least two parameter values configured for the partial bandwidth related parameter is agreed on by a protocol as a target parameter value.

In some implementations, the first indication information is carried by a MAC CE.

In some implementations, when the SRS indicated by the SRS resource set or SRS resource is a semi-persistent SRS, the MAC CE is a MAC CE for activating or deactivating the semi-persistent SRS.

In some implementations, the SRS configuration apparatus 160 further includes:

a third sending module, configured to send update information of the configuration information of the partial bandwidth related parameter, where the update information is used for updating a parameter value of the partial bandwidth related parameter.

In some implementations, the update information is carried by a MAC CE.

In some implementations, if at least two SRS resource sets or SRS resources satisfy one of the following conditions, a same parameter value is configured for at least one partial bandwidth related parameter of the at least two SRS resource sets or SRS resources:

the at least two SRS resource sets or SRS resources belong to a same cell;

the at least two SRS resource sets or SRS resources belong to a same carrier;

the at least two SRS resource sets or SRS resources belong to a same terminal;

bandwidth sizes of the at least two SRS resource sets or SRS resources are the same;

bandwidth frequency domain start positions of the at least two SRS resource sets or SRS resources are the same; and each of the at least two SRS resource sets or SRS resources supports a terminal with a partial bandwidth sounding capability.

Figure 17:
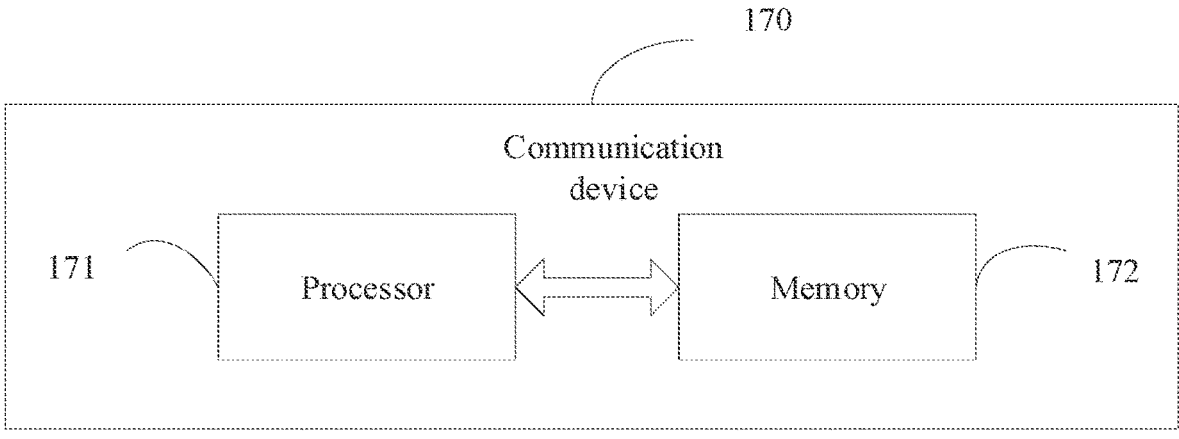
FIG. 17 is a block diagram of a communication device according to an embodiment of this application.

As shown in FIG. 17, an embodiment of this application further provides a communication device 170, including a processor 171, a memory 172, and a program or an instruction stored on the memory 172 and runnable on the processor 171. For example, when the communication device 170 is a terminal, the program or instruction, when being executed by the processor 171, implements each process of the foregoing SRS sending method embodiment, and can achieve the same technical effect. When the communication device 170 is a network side device, the program or instruction, when being executed by the processor 171, implements each process of the foregoing SRS receiving method or SRS configuration method embodiment, and can achieve the same technical effect. To avoid repetition, details are not described herein again.

Figure 18:
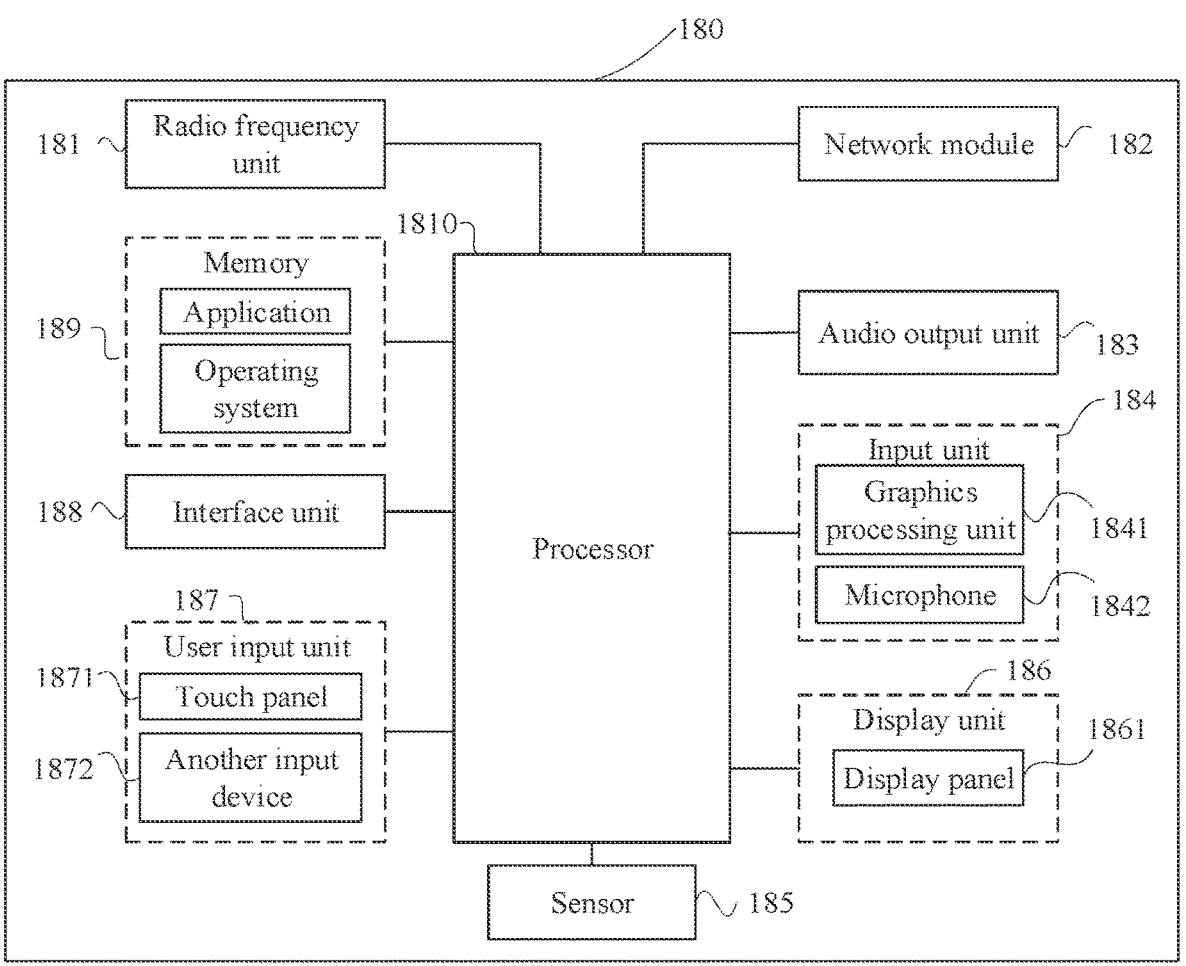
FIG. 18 is a block diagram of a terminal according to an embodiment of this application.

An embodiment of this application further provides a terminal, including a processor and a communication interface. The communication interface is configured to send an SRS in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1. Alternatively, the communication interface is configured to obtain configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter; and send an SRS according to the configuration information. The terminal embodiment corresponds to the foregoing method embodiment for the terminal side, and each implementation process and implementation manner of the foregoing method embodiment is applicable to the terminal embodiment, and can achieve the same technical effect. FIG. 18 is a schematic diagram of a hardware structure of a terminal according to an embodiment of this application.

The terminal 180 includes, but is not limited to, at least some components of a radio frequency unit 181, a network module 182, an audio output unit 183, an input unit 184, a sensor 185, a display unit 186, a user input unit 187, an interface unit 188, a memory 189, a processor 1810, and the like.

A person skilled in the art may understand that, the terminal 180 may further include a power supply (such as a battery) for supplying power to the components. The power supply may be logically connected to the processor 1810 by using a power management system, thereby implementing functions such as charging, discharging, and power consumption management by using the power management system. A terminal structure shown in FIG. 18 does not constitute a limitation to the terminal, and the terminal may include more or fewer components than those shown in the figure, or some components may be combined, or a different component deployment may be used. Details are not described herein.

It should be understood that, in embodiments of this application, the input unit 184 may include a Graphics Processing Unit (GPU) 1841 and a microphone 1842. The graphics processing unit 1841 performs processing on image data of a static picture or a video that is obtained by an image acquisition device (for example, a camera) in a video acquisition mode or an image acquisition mode. The display unit 186 may include a display panel 1861, for example, a display panel 1861 configured in a form such as a liquid crystal display or an organic light-emitting diode. The user input unit 187 includes a touch panel 1871 and another input device 1872. The touch panel 1871 is also referred to as a touchscreen The touch panel 1871 may include two parts: a touch detection apparatus and a touch controller. The another input device 1872 may include, but not limited to, a physical keyboard, a functional key (such as a volume control key or a switch key), a track ball, a mouse, and a joystick, which are not described herein in detail.

In embodiments of this application, the radio frequency unit 181 receives downlink data from a network side device, and then delivers the downlink data to the processor 1810 for processing; and in addition, sends uplink data to the network side device. Generally, the radio frequency unit 181 includes, but is not limited to, an antenna, at least one amplifier, a transceiver, a coupler, a low noise amplifier, a duplexer, and the like.

The memory 189 may be configured to store a software program or instruction and various data. The memory 189 may mainly include a program or instruction storage area and a data storage area. The program or instruction storage region may store an operating system, an application or instruction required by at least one function (for example, a voice playing function or an image playing function), and the like. In addition, the memory 189 may include a high-speed random access memory, or may further include a non-volatile memory, or the like. The nonvolatile memory may be a Read-Only Memory (ROM), a Programmable ROM (PROM), an Erasable PROM (EPROM), an Electrically EPROM (EEPROM), or a flash memory. For example, the nonvolatile memory is at least one magnetic disk storage device, a flash memory device, or other non-volatile solid-state storage devices.

The processor 1810 may include one or more processing units. In some implementations, the processor 1810 may integrate an application processor and a modem processor. The application processor mainly processes an operating system, a user interface, an application or instruction, and the like. The modem processor mainly processes wireless communication, and is, for example, a baseband processor. It can be understood that, the modem processor may not be integrated into the processor 1810.

In an embodiment, the radio frequency unit 181 is configured to send an SRS in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1.

In embodiments of this application, a terminal can send an SRS on a partial bandwidth of a complete bandwidth, and sending position indexes of partial bandwidths of at least two complete bandwidths are different, thereby helping the terminal obtain complete channel characteristics.

In some implementations, the radio frequency unit 181 is configured to send an SRS according to at least one of sending position indexes of partial bandwidths, a quantity M of sending position indexes of partial bandwidths in a partial frequency hopping period, a partial frequency hopping rule, and a sending position index sequence of partial bandwidths, where M is less than or equal to N.

In some implementations, M satisfies one of the following conditions:

M is equal to N;

if N partial bandwidth sizes corresponding to the N sending position indexes of the partial bandwidths are same, M is equal to N;

if N partial bandwidth sizes corresponding to the N sending position indexes of the partial bandwidths are not completely the same, M is equal to $N_1$, where $N_1$ is a quantity of sending position indexes corresponding to a maximum partial bandwidth size in the N partial bandwidths corresponding to the N sending position indexes of the partial bandwidths;

if N partial bandwidth sizes corresponding to the N sending position indexes of the partial bandwidths are not completely the same, M is equal to $N_2$, where $N_2$ is a quantity of sending position indexes corresponding to a minimum partial bandwidth size in the N partial bandwidths corresponding to the N sending position indexes of the partial bandwidths; and M is less than or equal to N, and is indicated by a network side device.

In some implementations, N is determined based on at least one of the following parameters: a partial bandwidth factor, a complete bandwidth size, and a partial bandwidth size.

In some implementations, the radio frequency unit 181 is configured to obtain configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter.

In some implementations, the radio frequency unit 181 is configured to receive first indication information, where the first indication information is used for indicating one target parameter value from the at least one parameter value configured for the partial bandwidth related parameter.

In some implementations, in one complete frequency hopping period, a sending position index of each partial bandwidth with frequency hopping enabled is the same.

In some implementations, a frequency hopping start position in a partial bandwidth in one complete frequency hopping period is a frequency domain position determined according to a start position of a first time of frequency hopping agreed on by a protocol;

or a frequency hopping start position in a partial bandwidth in one complete frequency hopping period is a frequency domain position determined according to X symbols or slots after enabling of partial frequency hopping.

In some implementations, in adjacent complete frequency hopping periods, sending position indexes of partial bandwidths with frequency hopping enabled are different.

In some implementations, sending position indexes of adjacent partial bandwidths are different.

In some implementations, the radio frequency unit 181 is configured to receive partial frequency hopping enabling signaling, where the partial frequency hopping enabling signaling is used for indicating whether the terminal, one SRS resource set, or one SRS resource enables partial frequency hopping.

In some implementations, the partial frequency hopping enabling signaling is DCI, a MAC CE, or RRC signaling.

In some implementations, the radio frequency unit 181 is configured to perform one of the following:

sending an SRS in the partial frequency hopping manner in X symbols or slots after receiving of the partial frequency hopping enabling signaling; and sending an SRS in the partial frequency hopping manner in X symbols or slots after reporting of ACK or NACK feedback after receiving of the partial frequency hopping enabling signaling.

In some implementations, the partial frequency hopping rule is increasing index values in forward order or reducing index values in reverse order.

In some implementations, the partial frequency hopping rule is:

a sending position index of a partial bandwidth of current frequency hopping=(a sending position index of a partial bandwidth of a previous time of frequency hopping+n)mod(M);

or a sending position index of a partial bandwidth of current frequency hopping=(a sending position index of a partial bandwidth of a previous time of frequency hopping+n)mod(N);

or a sending position index of a partial bandwidth of current frequency hopping=(a sending position index of a partial bandwidth of a previous time of frequency hopping−n)mod(M);

or a sending position index of a partial bandwidth of current frequency hopping=(a sending position index of a partial bandwidth of a previous time of frequency hopping−n)mod(N), where n is an increased value of a sending position index of a partial bandwidth in each complete frequency hopping period or each time of frequency hopping.

In some implementations, the processor 1810 is configured to determine a sending position index sequence of partial bandwidths according to indication information sent by a network side device, where the indication information is used for indicating the sending position index sequence of the partial bandwidths.

In some implementations, the sending position index sequence of the partial bandwidths satisfies at least one of the following conditions:

a maximum index value in the sending position index sequence of the partial bandwidths is equal to M or M−1;

a quantity of indexes in the sending position index sequence of the partial bandwidths is not greater than M;

a same index value is configurable in the sending position index sequence of the partial bandwidths; and all index values in the sending position index sequence of the partial bandwidths are different.

In some implementations, a $y^{th}$ index value in the sending position index sequence of the partial bandwidths is used for indicating a sending start position in a partial bandwidth before enabling of partial frequency hopping.

In some implementations, y is a positive integer greater than or equal to 1, and is agreed on by a protocol or configured by a network.

In some implementations, the sending position index sequence of the partial bandwidths takes effect after enabling of partial frequency hopping;

or the sending position index sequence of the partial bandwidths takes effect after configuration.

In some implementations, the sending position index sequence of the partial bandwidths is determined according to at least one of the following parameters: a frequency domain position index $N_b$, a value $n_{SRS}$ of an SRS sending position counter, a parameter $b_{hop}$ used for determining whether to perform frequency hopping and a quantity of times of frequency hopping, a complete bandwidth $m_{SRS,b}$ of the SRS on one OFDM symbol, an SRS bandwidth sending start position parameter $n_{RRC}$, a frequency hopping index parameter $B_{SRS}$, the quantity M of the sending position indexes of the partial bandwidths in the partial frequency hopping period, a sending position index quantity N, a partial bandwidth factor, and a sending start position in a partial bandwidth.

In some implementations, the SRS is a periodic SRS or a semi-persistent SRS.

In another embodiment, the radio frequency unit 181 is configured to obtain configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter; and send an SRS according to the configuration information.

In embodiments of this application, the network side device flexibly indicates the partial bandwidth related parameter, thereby sending the SRS according to the indicated partial bandwidth related parameter.

In some implementations, the radio frequency unit 181 is configured to receive first indication information, where the first indication information is used for indicating one target parameter value from the at least one parameter value configured for the partial bandwidth related parameter; and send the SRS according to the target parameter value.

In some implementations, the first indication information is carried by DCI.

In some implementations, a time domain type corresponding to the SRS resource set or SRS resource is an aperiodic type, the SRS resource set or SRS resource includes at least one trigger state trigger state, and each trigger state is able to be associated with at least one parameter value of at least one partial bandwidth related parameter; and the DCI chooses, through an SRS request field, to trigger the SRS resource set or the SRS resource for which a target trigger state is correspondingly configured.

In some implementations, the radio frequency unit 181 is configured to send, if the target trigger state is associated with the partial bandwidth related parameter, the SRS according to the at least one parameter value of the at least one partial bandwidth related parameter associated with the trigger state.

In some implementations, if at least two parameter values are configured for the partial bandwidth related parameter associated with the target trigger state, the DCI is further used for indicating one target parameter value from at least two parameter values configured for the partial bandwidth related parameter through a first field, and the first field and the SRS request field are different fields;

or one of the at least two parameter values configured for the partial bandwidth related parameter is agreed on by a protocol as a target parameter value.

In some implementations, the processor 1810 is configured to determine, if the target trigger state is not associated with the partial bandwidth related parameter, that a partial bandwidth sounding function is not enabled.

In some implementations, a time domain type corresponding to the SRS resource set or SRS resource is an aperiodic type;

the DCI chooses, through an SRS request field, to trigger a target aperiodic SRS in the SRS resource set or SRS resource; and each code point of the SRS request field is able to be associated with at least one parameter value of at least one partial bandwidth related parameter.

In some implementations, the radio frequency unit 181 is configured to send, if the SRS request field used for triggering the target aperiodic SRS is associated with the partial bandwidth related parameter, the SRS according to the at least one parameter value of the at least one partial bandwidth related parameter associated with the SRS request field.

In some implementations, if at least two parameter values are configured for the partial bandwidth related parameter associated with the SRS request field used for triggering the target aperiodic SRS, the DCI is further used for indicating one target parameter value from at least two parameter values configured for the partial bandwidth related parameter through a first field, and the first field and the aperiodic SRS request field are different fields;

or one of the at least two parameter values configured for the partial bandwidth related parameter is agreed on by a protocol as a target parameter value.

In some implementations, the first indication information is carried by a MAC CE.

In some implementations, when the SRS indicated by the SRS resource set or SRS resource is a semi-persistent SRS, the MAC CE is a MAC CE for activating or deactivating the semi-persistent SRS.

In some implementations, the radio frequency unit 181 is configured to receive update information of the configuration information of the partial bandwidth related parameter, where the update information is used for updating a parameter value of the partial bandwidth related parameter.

In some implementations, the update information is carried by a MAC CE.

In some implementations, if only one parameter value is configured for the partial bandwidth related parameter, the radio frequency unit 181 is configured to send the SRS according to the parameter value of the partial bandwidth related parameter configured in the configuration information.

In some implementations, if at least two SRS resource sets or SRS resources satisfy one of the following conditions, a same parameter value is configured for at least one partial bandwidth related parameter of the at least two SRS resource sets or SRS resources:

the at least two SRS resource sets or SRS resources belong to a same cell;

the at least two SRS resource sets or SRS resources belong to a same carrier;

the at least two SRS resource sets or SRS resources belong to a same terminal;

bandwidth sizes of the at least two SRS resource sets or SRS resources are the same;

bandwidth frequency domain start positions of the at least two SRS resource sets or SRS resources are the same; and each of the at least two SRS resource sets or SRS resources supports a terminal with a partial bandwidth sounding capability.

An embodiment of this application further provides a network side device, including a processor and a communication interface. The communication interface is configured to receive an SRS sent by a terminal in a partial frequency hopping manner on a complete bandwidth corresponding to R OFDM symbols in one SRS resource set or SRS resource, where the partial frequency hopping manner satisfies: the SRS is sent on a partial bandwidth in each complete bandwidth, there are at least two complete bandwidths, and sending position indexes of partial bandwidths in the at least two complete bandwidths are different, and R is a repetition factor and is a positive integer greater than or equal to 1. Alternatively, the communication interface is configured to send configuration information of a partial bandwidth related parameter of an SRS resource set or SRS resource, where the partial bandwidth related parameter includes at least one of the following: a partial bandwidth factor, a rounding manner for a partial bandwidth, and a sending start position in a partial bandwidth, and at least one parameter value is configured for each partial bandwidth related parameter. The network side device embodiment corresponds to the foregoing method embodiment for the network side device, and each implementation process and implementation manner of the foregoing network side device embodiment is applicable to the terminal embodiment, and can achieve the same technical effect.

Figure 19:
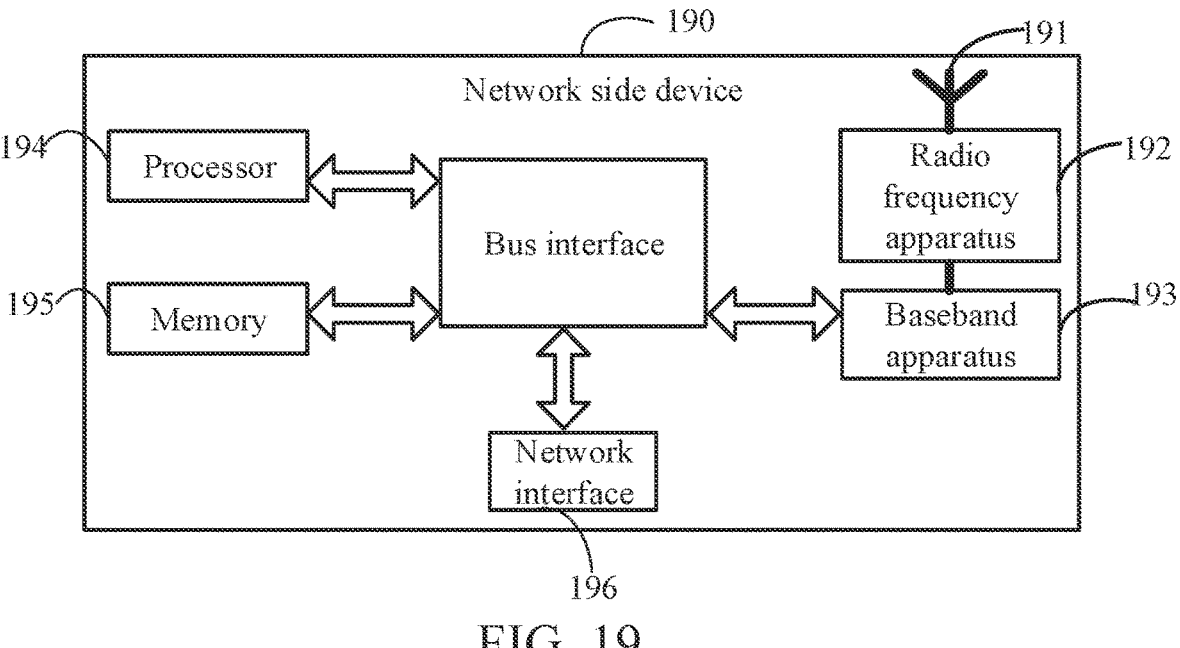
FIG. 19 is a block diagram of a network side device according to an embodiment of this application.

An embodiment of this application further provides a network side device. As shown in FIG. 19, the network device 190 includes: an antenna 191, a radio frequency apparatus 192, and a baseband apparatus 193. The antenna 191 is connected to the radio frequency apparatus 192. In an uplink direction, the radio frequency apparatus 192 receives information by using the antenna 191, and sends the received information to the baseband apparatus 193 for processing. In a downlink direction, the baseband apparatus 193 processes information to be sent, and sends the information to the radio frequency apparatus 192. The radio frequency apparatus 192 processes the received information and sends the information by using the antenna 191.

The foregoing frequency band processing apparatus may be located in the baseband apparatus 193. The method performed by the network side device in the foregoing embodiments may be implemented in the baseband apparatus 193. The baseband apparatus 193 includes a processor 194 and a memory 195.

The baseband apparatus 193 may include, for example, at least one baseband plate. A plurality of chips are disposed on the baseband plate. As shown in FIG. 19, one of the plurality of chips is, for example, the processor 194, and is connected to the memory 195, to invoke a program in the memory 195 to perform operations of the network device in the foregoing method embodiments.

The baseband apparatus 193 may further include a network interface 196, configured to exchange information with the radio frequency apparatus 192. The interface is, for example, a Common Public Radio Interface (CPRI).

The network side device in this embodiment of the present disclosure further includes: an instruction or a program stored on the memory 195 and runnable on the processor 194. The processor 194 invokes the instruction or program in the memory 195 to perform the method performed by the modules shown in FIG. 15 or FIG. 16, and achieve the same technical effect. To avoid repetition, details are not described herein again.

An embodiment of this application further provides a readable storage medium. The readable storage medium stores a program or an instruction. The program or instruction, when being executed by a processor, implements each process of the foregoing SRS sending method, SRS receiving method, or SRS configuration method embodiment, and can achieve the same technical effect. To avoid repetition, details are not described herein again.

The processor is a processor in the terminal described in the foregoing embodiments. The readable storage medium includes a computer-readable storage medium, for example, a computer Read-Only Memory (ROM), a Random Access Memory (RAM), a magnetic disk, an optical disc, or the like.

An embodiment of this application further provides a chip. The chip includes a processor and a communication interface. The communication interface is coupled to the processor. The processor is configured to run the program or instruction, to implement each process of the foregoing SRS sending method, SRS receiving method, or SRS configuration method embodiment, and can achieve the same technical effect. To avoid repetition, details are not described herein again.

It should be noted that, the chip mentioned in the embodiments of this application may also be referred to as a system-level chip, a system chip, a chip system, a system on chip, or the like.

An embodiment of this application further provides a computer program product. The computer program product is stored in a non-transient storage medium. The computer program product is executed by at least one processor to implement each process of the foregoing SRS sending method, SRS receiving method, or SRS configuration method embodiment, and can achieve the same technical effect. To avoid repetition, details are not described herein again.

It should be noted that the terms "include," "include," or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the range of the method and apparatus in the implementation manners of this application is not limited to performing functions in the shown or discussed order, and may further include performing functions in a basically simultaneous manner or in reverse order according to the involved functions. For example, the described method may be performed in an order different from the described order, and steps may be further added, omitted, or combined. In addition, features described with reference to some examples may be combined in other examples.

Through the descriptions of the foregoing implementations, a person skilled in the art may clearly understand that the method according to the foregoing embodiments may be implemented by using software and a necessary general hardware platform, and certainly, may alternatively be implemented by hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and components displayed as units may or may not be physical units, that is, may be located in one position, or may be distributed on a plurality of network units. Some or all of the units may be selected according to actual needs to achieve the objectives of the solutions of the embodiments.

In addition, functional units in embodiments of this application may be integrated into one processing unit, each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes: any medium that can store program code, such as a USB flash drive, a removable hard disk, a ROM, a RAM, a magnetic disk, or an optical disc.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A Sounding Reference Signal (SRS) sending method, comprising:

sending, by a terminal, an SRS in a partial frequency hopping manner on a complete bandwidth corresponding to R Orthogonal Frequency Division Multiplexing (OFDM) symbols in one SRS resource set or SRS resource, wherein the partial frequency hopping manner satisfies that the SRS is sent on a partial bandwidth in each complete bandwidth, there are at least two complete bandwidths, wherein R is a repetition factor and is a positive integer greater than or equal to 1, wherein the sending, by a terminal, an SRS in a partial frequency hopping manner on a complete bandwidth corresponding to R OFDM symbols in one SRS resource comprises:

sending, by the terminal, the SRS according to at least one of: sending position indexes of partial bandwidths, a quantity M of sending position indexes of partial bandwidths in a partial frequency hopping period, a partial frequency hopping rule, or a sending position index sequence of partial bandwidths, wherein M is less than or equal to N, and wherein in adjacent complete frequency hopping periods, sending position indexes of partial bandwidths with frequency hopping enabled are different.

2. The SRS sending method according to claim 1, wherein M satisfies one of the following conditions:

M is equal to N, wherein N is a quantity of sending position indexes of partial bandwidths determined from the complete bandwidths corresponding to the R OFDM symbols, and N is a positive integer greater than or equal to 1;

when N partial bandwidth sizes corresponding to the N sending position indexes of the partial bandwidths are same, M is equal to N;

when N partial bandwidth sizes corresponding to the N sending position indexes of the partial bandwidths are not completely the same, M is equal to $N_1$, wherein $N_1$ is a quantity of sending position indexes corresponding to a maximum partial bandwidth size in the N partial bandwidths corresponding to the N sending position indexes of the partial bandwidths;

when N partial bandwidth sizes corresponding to the N sending position indexes of the partial bandwidths are not completely the same, M is equal to $N_2$, wherein $N_2$ is a quantity of sending position indexes corresponding to a minimum partial bandwidth size in the N partial bandwidths corresponding to the N sending position indexes of the partial bandwidths; or M is less than or equal to N, and is indicated by a network side device, wherein N is determined based on at least one of the following parameters: a partial bandwidth factor, a complete bandwidth size, or a partial bandwidth size.

3. The SRS sending method according to claim 1, wherein in one complete frequency hopping period, a sending position index of each partial bandwidth with frequency hopping enabled is the same.

4. The SRS sending method according to claim 3, wherein:

a frequency hopping start position in a partial bandwidth in one complete frequency hopping period is a frequency domain position determined according to a start position of a first time of frequency hopping agreed on by a protocol; or a frequency hopping start position in a partial bandwidth in one complete frequency hopping period is a frequency domain position determined according to X symbols or slots after enabling of partial frequency hopping.

5. The SRS sending method according to claim 1, further comprising:

receiving, by the terminal, partial frequency hopping enabling signaling, wherein the partial frequency hopping enabling signaling is used for indicating whether the terminal, one SRS resource set, or one SRS resource enables partial frequency hopping, wherein the partial frequency hopping enabling signaling is Radio Resource Control (RRC) signaling.

6. The SRS sending method according to claim 5, wherein the sending, by a terminal, an SRS in a partial frequency hopping manner on a complete bandwidth corresponding to R OFDM symbols in one SRS resource comprises one of the following:

sending, by the terminal, an SRS in the partial frequency hopping manner in X symbols or slots after receiving of the partial frequency hopping enabling signaling; or sending, by the terminal, an SRS in the partial frequency hopping manner in X symbols or slots after reporting of ACKnowledgement (ACK) or Negative ACKnowledgement (NACK) feedback after receiving of the partial frequency hopping enabling signaling.

7. The SRS sending method according to claim 1, wherein the partial frequency hopping rule is increasing index values in forward order or reducing index values in reverse order.

8. The SRS sending method according to claim 7, wherein the partial frequency hopping rule is:

a sending position index of a partial bandwidth of current frequency hopping=(a sending position index of a partial bandwidth of a previous time of frequency hopping+n) mod (M);

a sending position index of a partial bandwidth of current frequency hopping=(a sending position index of a partial bandwidth of a previous time of frequency hopping+n) mod (N);

a sending position index of a partial bandwidth of current frequency hopping=(a sending position index of a partial bandwidth of a previous time of frequency hopping-n) mod (M); or a sending position index of a partial bandwidth of current frequency hopping=(a sending position index of a partial bandwidth of a previous time of frequency hopping-n) mod (N), wherein n is an increased value of a sending position index of a partial bandwidth in each complete frequency hopping period or each time of frequency hopping.

9. The SRS sending method according to claim 1, further comprising:

determining a sending position index sequence in partial bandwidths according to indication information sent by a network side device, wherein the indication information is used for indicating the sending position index sequence of the partial bandwidths, wherein the sending position index sequence of the partial bandwidths satisfies at least one of the following conditions:

a maximum index value in the sending position index sequence of the partial bandwidths is equal to M or M−1;

a quantity of indexes in the sending position index sequence of the partial bandwidths is not greater than M;

a same index value is configurable in the sending position index sequence of the partial bandwidths; or all index values in the sending position index sequence of the partial bandwidths are different.

10. The SRS sending method according to claim 1, wherein the sending position index sequence of the partial bandwidths is determined according to at least one of the following parameters:

a frequency domain position index $N_b$;

a value $n_{SRS}$ of an SRS sending position counter;

a parameter $b_{hop}$ used for determining whether to perform frequency hopping and a quantity of times of frequency hopping;

a complete bandwidth $m_{SRS,b}$ of the SRS on one OFDM symbol;

an SRS bandwidth sending start position parameter $n_{RRC}$;

a frequency hopping index parameter $B_{SRS}$;

the quantity M of the sending position indexes of the partial bandwidths in the partial frequency hopping period;

a sending position index quantity N;

a partial bandwidth factor; or a sending start position in a partial bandwidth.

11. A terminal, comprising:

a memory storing computer-readable instructions; and a processor coupled to the memory and configured to execute the computer-readable instructions, wherein the computer-readable instructions, when executed by the processor, cause the processor to perform operations comprising:

sending a Sounding Reference Signal (SRS) in a partial frequency hopping manner on a complete bandwidth corresponding to R Orthogonal Frequency Division Multiplexing (OFDM) symbols in one SRS resource set or SRS resource, wherein the partial frequency hopping manner satisfies that the SRS is sent on a partial bandwidth in each complete bandwidth, there are at least two complete bandwidths, wherein R is a repetition factor and is a positive integer greater than or equal to 1, wherein the sending, by a terminal, an SRS in a partial frequency hopping manner on a complete bandwidth corresponding to R OFDM symbols in one SRS resource comprises:

sending, by the terminal, the SRS according to at least one of: sending position indexes of partial bandwidths, a quantity M of sending position indexes of partial bandwidths in a partial frequency hopping period, a partial frequency hopping rule, or a sending position index sequence of partial bandwidths, wherein M is less than or equal to N, and wherein in adjacent complete frequency hopping periods, sending position indexes of partial bandwidths with frequency hopping enabled are different.

12. The terminal according to claim 11, wherein M satisfies one of the following conditions:

M is equal to N, wherein N is a quantity of sending position indexes of partial bandwidths determined from the complete bandwidths corresponding to the R OFDM symbols, and N is a positive integer greater than or equal to 1;

when N partial bandwidth sizes corresponding to the N sending position indexes of the partial bandwidths are same, M is equal to N;

when N partial bandwidth sizes corresponding to the N sending position indexes of the partial bandwidths are not completely the same, M is equal to $N_1$, wherein $N_1$ is a quantity of sending position indexes corresponding to a maximum partial bandwidth size in the N partial bandwidths corresponding to the N sending position indexes of the partial bandwidths;

when N partial bandwidth sizes corresponding to the N sending position indexes of the partial bandwidths are not completely the same, M is equal to $N_2$, wherein $N_2$ is a quantity of sending position indexes corresponding to a minimum partial bandwidth size in the N partial bandwidths corresponding to the N sending position indexes of the partial bandwidths; or M is less than or equal to N, and is indicated by a network side device, wherein N is determined based on at least one of the following parameters: a partial bandwidth factor, a complete bandwidth size, or a partial bandwidth size.

13. The terminal according to claim 11, wherein in one complete frequency hopping period, a sending position index of each partial bandwidth with frequency hopping enabled is the same.

14. The terminal according to claim 13, wherein:

a frequency hopping start position in a partial bandwidth in one complete frequency hopping period is a frequency domain position determined according to a start position of a first time of frequency hopping agreed on by a protocol; or a frequency hopping start position in a partial bandwidth in one complete frequency hopping period is a frequency domain position determined according to X symbols or slots after enabling of partial frequency hopping.

15. The terminal according to claim 11, wherein the operations further comprise:

receiving partial frequency hopping enabling signaling, wherein the partial frequency hopping enabling signaling is used for indicating whether the terminal, one SRS resource set, or one SRS resource enables partial frequency hopping, wherein the partial frequency hopping enabling signaling is Radio Resource Control (RRC) signaling.

16. A non-transitory computer-readable medium storing instructions that, when executed by a processor, cause the processor to perform operations comprising:

sending a Sounding Reference Signal (SRS) in a partial frequency hopping manner on a complete bandwidth corresponding to R Orthogonal Frequency Division Multiplexing (OFDM) symbols in one SRS resource set or SRS resource, wherein the partial frequency hopping manner satisfies that the SRS is sent on a partial bandwidth in each complete bandwidth, there are at least two complete bandwidths, wherein R is a repetition factor and is a positive integer greater than or equal to 1, wherein the sending, by a terminal, an SRS in a partial frequency hopping manner on a complete bandwidth corresponding to R OFDM symbols in one SRS resource comprises:

sending, by the terminal, the SRS according to at least one of: sending position indexes of partial bandwidths, a quantity M of sending position indexes of partial bandwidths in a partial frequency hopping period, a partial frequency hopping rule, or a sending position index sequence of partial bandwidths, wherein M is less than or equal to N, and wherein in adjacent complete frequency hopping periods, sending position indexes of partial bandwidths with frequency hopping enabled are different.

* * * * *